United States Patent
Göransson et al.

(10) Patent No.: US 9,054,415 B2
(45) Date of Patent: Jun. 9, 2015

(54) PHASE CALIBRATION AND ERRONEOUS CABLING DETECTION FOR A MULTI-ANTENNA RADIO BASE STATION

(75) Inventors: Bo Göransson, Sollentuna (SE); Sven Petersson, Sävedalen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 731 days.

(21) Appl. No.: 13/146,421

(22) PCT Filed: Jan. 30, 2009

(86) PCT No.: PCT/SE2009/050100
§ 371 (c)(1),
(2), (4) Date: Jul. 27, 2011

(87) PCT Pub. No.: WO2010/087749
PCT Pub. Date: Aug. 5, 2010

(65) Prior Publication Data
US 2012/0033759 A1 Feb. 9, 2012

(51) Int. Cl.
*H04B 7/02* (2006.01)
*H04L 1/02* (2006.01)
*H01Q 3/26* (2006.01)
*H04B 7/06* (2006.01)

(52) U.S. Cl.
CPC ............. *H01Q 3/267* (2013.01); *H04B 7/061* (2013.01); *H04B 7/0639* (2013.01); *H04B 17/17* (2015.01); *H04B 17/21* (2015.01); *H04B 17/24* (2015.01)

(58) Field of Classification Search
None
See application file for complete search history.

(56) References Cited

U.S. PATENT DOCUMENTS

| | | | |
|---|---|---|---|
| 6,229,483 B1 | 5/2001 | Looström | |
| 2009/0054093 A1* | 2/2009 | Kim et al. | 455/500 |
| 2009/0093222 A1* | 4/2009 | Sarkar | 455/115.1 |
| 2012/0088514 A1* | 4/2012 | Lee et al. | 455/450 |
| 2013/0114763 A1* | 5/2013 | Park | 375/296 |

FOREIGN PATENT DOCUMENTS

| | | |
|---|---|---|
| EP | 1892850 A2 | 2/2008 |
| WO | 9907034 A1 | 2/1999 |

(Continued)

OTHER PUBLICATIONS

ETSI, "LTE; Evolved Universal Terrestrial Radio Access (E-UTRA); Physical channels and modulation (3GPP TS 36.211 version 10.7.0 Release 10)", ETSI TS 136 211 V10.7.0, Apr. 2013, pp. 1-103.

(Continued)

*Primary Examiner* — Shuwang Liu
*Assistant Examiner* — Gina McKie
(74) *Attorney, Agent, or Firm* — Coats and Bennett, PLLC

(57) ABSTRACT

A radio base station has at least two radio chains and a precoder for precoding information symbols by a precoding matrix for multi-antenna transmission to a number of user equipment terminals. Precoding matrix statistics representative of phase coherency between at least two radio chains is compiled based on feedback information representative of preferred precoding matrix from one or more user equipment terminals (S1). A relative phase error is then detected between radio chains based on the compiled precoding matrix statistics (S2). It is then possible to compensate or otherwise adjust for the detected relative phase error (S3) based on the compiled precoding matrix statistics.

11 Claims, 21 Drawing Sheets

(56) References Cited

FOREIGN PATENT DOCUMENTS

| WO | 02/11237 | A1 | 2/2002 |
|----|----------|----|--------|
| WO | 2008/082344 | A1 | 7/2008 |
| WO | 2008082345 | A1 | 7/2008 |

OTHER PUBLICATIONS

ETSI, "LTE; Evolved Universal Terrestrial Radio Access (E-UTRA); Physical layer procedures (3GPP TS 36.213 version 10.11.0 Release 10)", ETSI TS 136 213 V10.11.0, Jan. 2014, pp. 1-129.

* cited by examiner

PHASE CALIBRATION AND ERRONEOUS
CABLING DETECTION FOR A
MULTI-ANTENNA RADIO BASE STATION

TECHNICAL FIELD

The present invention generally relates to radio communications technology and more particularly to improvements related to a multi-antenna radio base station, and especially detection and/or handling of relative phase errors between radio chains in such a multi-antenna radio base station.

BACKGROUND

It is well-known that the use of multiple antennas at the transmitter and/or the receiver can significantly boost the performance of a wireless system. Such antenna configurations have the potential of both improving data rates and increasing coverage.

Precoding [1, 2] is a popular multi-antenna technique for improving the performance of a multi-antenna system by transforming the information carrying transmit vector so that it better fits the channel conditions. This can be done based on instantaneous channel information or long term channel information or some combination thereof. Often, precoding is implemented as performing a (linear) transformation on the information carrying vector prior to transmission. Such transformation is usually represented by a matrix. Precoding is an integral part of Long Term Evolution (LTE) as well as Wideband Code Division Multiple Access (WCDMA) systems. Precoding is also referred to as closed loop transmit diversity coding.

Precoding can be used in conjunction with any antenna configuration, resulting in correlated, uncorrelated or a combination thereof, radio channels.

Of particular interest for the present invention are antenna configurations where radio channels are correlated or a combination of both correlated and uncorrelated radio channels. FIGS. 1A and 1B illustrate two different examples of antenna configurations. FIG. 1A illustrates a simple example of a linear array of M closely spaced antenna columns having identical polarization. The column spacing may for example be in the order of 0.5 wave lengths typically resulting in radio channels having high correlation. FIG. 1B illustrates an example in the form of a linear array of N dual polarized antenna columns, where the spacing may be in the order of 1.0 wave lengths or less depending on realization, typically resulting in correlated radio channels within a polarization and uncorrelated channels between polarizations.

When antenna elements are closely spaced, and thus the radio channels typically are correlated, a beam (typically but not always narrow) is generated when the precoding vector or matrix from the codebook is applied. The vectors in the codebook in LTE, for example, are designed for, or at least best suited for, a scenario where the radio chains are coherent. This means that if the coherency is not sufficient performance will be degraded. Coherency generally describes correlation properties between physical quantities of waves (including radio and microwaves), and may be expressed in terms of for example amplitude-, time- and phase-relations. Although time and phase are interrelated, the requirements on time coherency and phase coherency are usually on completely different levels. Although there may be time coherency (signal bandwidth related) in a system, the phase (carrier frequency related) may still be more or less random.

To detect and/or ensure sufficient phase coherency some type of detection/calibration is normally required. Calibration is an area of large interest, and has been so for many years, and a considerable amount of patents exists. In a typical implementation for detection/calibration in a radio base station 10 having an antenna system 12, there normally exists a special detection/calibration branch/network 14 with an associated transceiver 15, and signals are then coupled to/from the detection/calibration branch 14 and the ordinary radio chains 16, 18 of the radio base station, as schematically illustrated in FIG. 2. For detection/calibration in the receiver direction, a calibration signal from the transceiver 15 is inserted via the detection/calibration branch 14 into all radio chains, often in or near the antennas, in order to determine how the radio chains are related in phase and/or amplitude. For detection/calibration in the transmitter direction, the detection/calibration branch 14 operates as a probe, in or near the antennas, for measuring transmitted signals in a systematic manner in order to determine how the radio chains are related in phase and/or amplitude. Suitable calibration or compensation can then be performed on the basis of the determined phase and/or amplitude relation.

Major drawbacks or problems with conventional detection/calibration implementations include the need for an extra feeder, the need for a special radio chain for transmission/reception of detection/calibration signals, and also that detection/calibration may require that normal transmission/reception is interrupted.

Reference [3] discloses an implementation not using a special detection/calibration signal, but rather based on observing the normal data to be transmitted. In this way it is not necessary to interrupt the normal operation. However, there is still a need for a special detection/calibration branch.

Reference [4] generally relates to a radio device having a number of transmission equipments, and especially to a technique for deriving a relative time delay of the transmission equipments based on at least two sub-band transmit weight vectors.

SUMMARY

It is an object of the present invention to enhance the operation of a radio base station having at least two radio chains.

In particular it is desirable to be able to detect and/or handle relative phase errors between radio chains in a radio base station.

It is a specific object of the present invention to provide a method for handling a relative phase error between radio chains in a radio base station.

It is another specific object of the present invention to provide an improved radio base station capable of handling a relative phase error between radio chains.

Still another specific object is to provide a detector for detecting a relative phase error between radio chains in a radio base station.

It is yet another specific object to provide a method for detecting incorrect interconnection of radio chains and antennas in a radio base station.

It is also a specific object to provide a detector for detecting incorrect interconnection of radio chains and antennas in a radio base station.

These and other objects are met by the invention as defined by the accompanying patent claims.

The invention generally relates to a radio base station, which has at least two radio chains and a precoder for precoding information symbols by a precoding matrix for multi-antenna transmission to a number of user equipment terminals. Typically, the radio base station receives feedback information from one or more user equipment terminals representative of which precoding matrix that is preferred.

The inventors have recognized that precoding matrix statistics based on such feedback information has the property, at least for LTE, of being able to represent the phase coherency between radio chains in the base station.

one or more embodiments herein therefore compile precoding matrix statistics representative of phase coherency between at least two radio chains based on feedback information representative of preferred precoding matrix from one or more user equipment terminals, and detect a relative phase error between radio chains based on the compiled precoding matrix statistics. It is then possible to compensate or otherwise adjust for the detected relative phase error based on the precoding matrix statistics.

In this way, relevant information on the phase coherency situation can be obtained in an efficient manner by analyzing already existing feedback information from the user equipment terminals to the radio base station. This also enables sufficient phase coherency between radio chains in the radio base station, when corresponding compensation is applied. No extra signaling is required, and there is no need for a special detection/calibration branch in the base station.

Normally, the detection of a relative phase error includes at least detection of the presence of a relative phase error, and the compensation includes estimation of the magnitude and sign of a phase compensation value, which can then be applied to one or more of the radio chains.

The invention provides a radio base station having means for compiling precoding matrix statistics representative of phase coherency between at least two of the radio chains based on feedback information representative of preferred precoding matrix from one or more of the user equipment terminals. The radio base station further comprises means for detecting a relative phase error between at least two of the radio chains based on the precoding matrix statistics, and means for compensating for the detected relative phase error based on the precoding matrix statistics.

A corresponding detector for a radio base station basically comprises an input unit for receiving precoding matrix statistics representative of phase coherency between at least two of the radio chains, and a detector unit for detecting a relative phase error between at least two of the radio chains based on the received precoding matrix statistics.

A related aspect of the invention concerns a method and corresponding detector for detecting incorrect interconnection of radio chains and antennas in a radio base station.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1B:
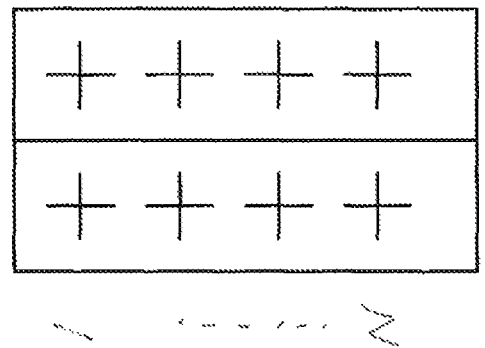
FIGS. 1A-B schematically illustrate different examples of antenna configurations including correlated antennas.
Figure 1A:
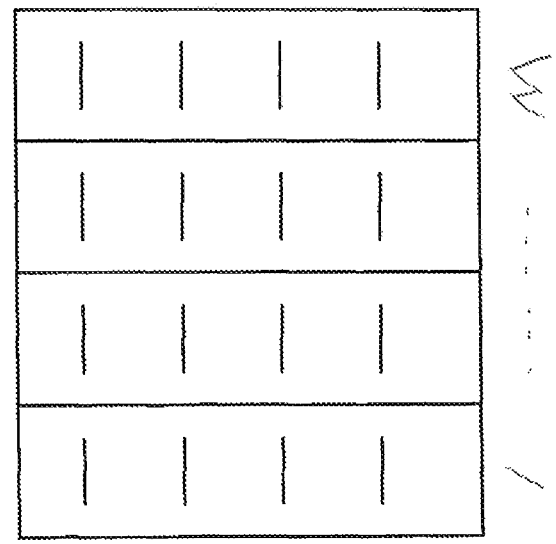
Figure 2:
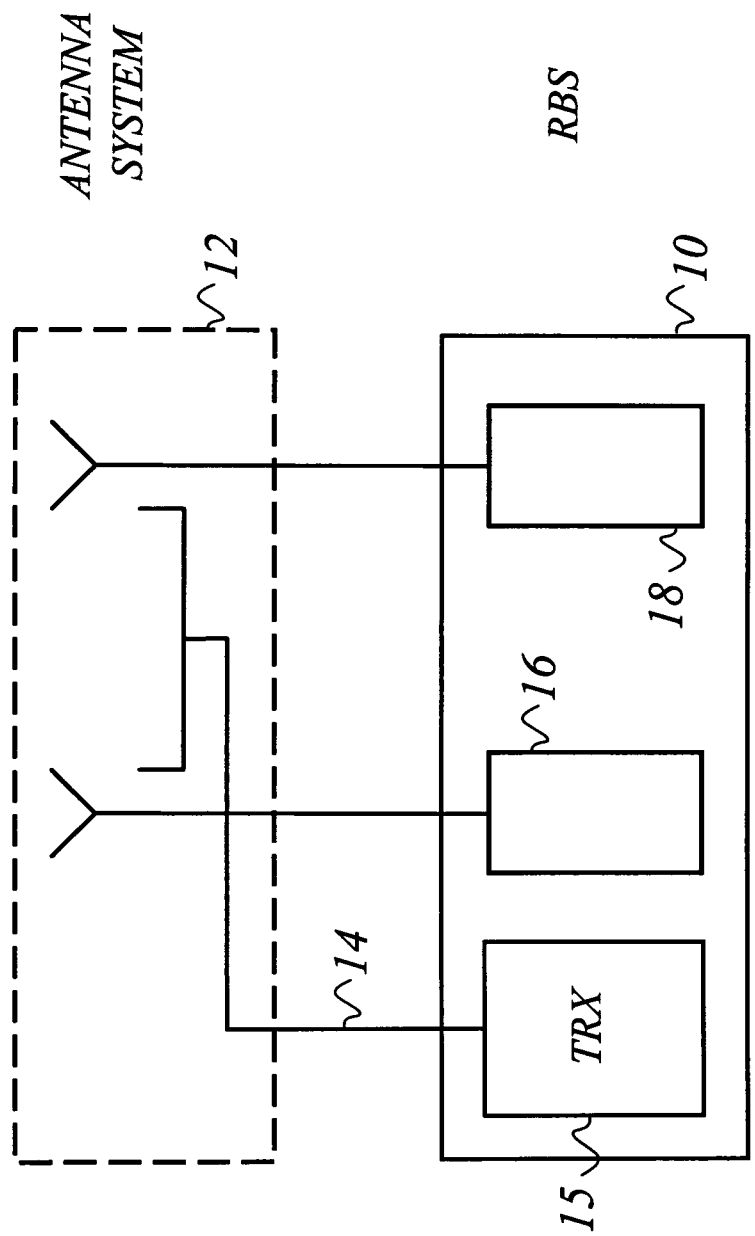
FIG. 2 schematically illustrates a typical implementation for detection/calibration of a phase error in a radio base station.

Throughout the drawings, the same reference characters will be used for corresponding or similar elements.

When codebook based precoding is applied for downlink transmission, user equipment (UE) terminals normally report the preferred precoding matrix index (PMI) or equivalent representation. For site installations where antennas are located such that the received signals are correlated, the inventors have realized that the preferred matrix indices can be used as a measure of phase coherency between radio chains. If it is detected that coherency is insufficient a phase compensation may then be applied to one or more of the radio chains.

Figure 3:
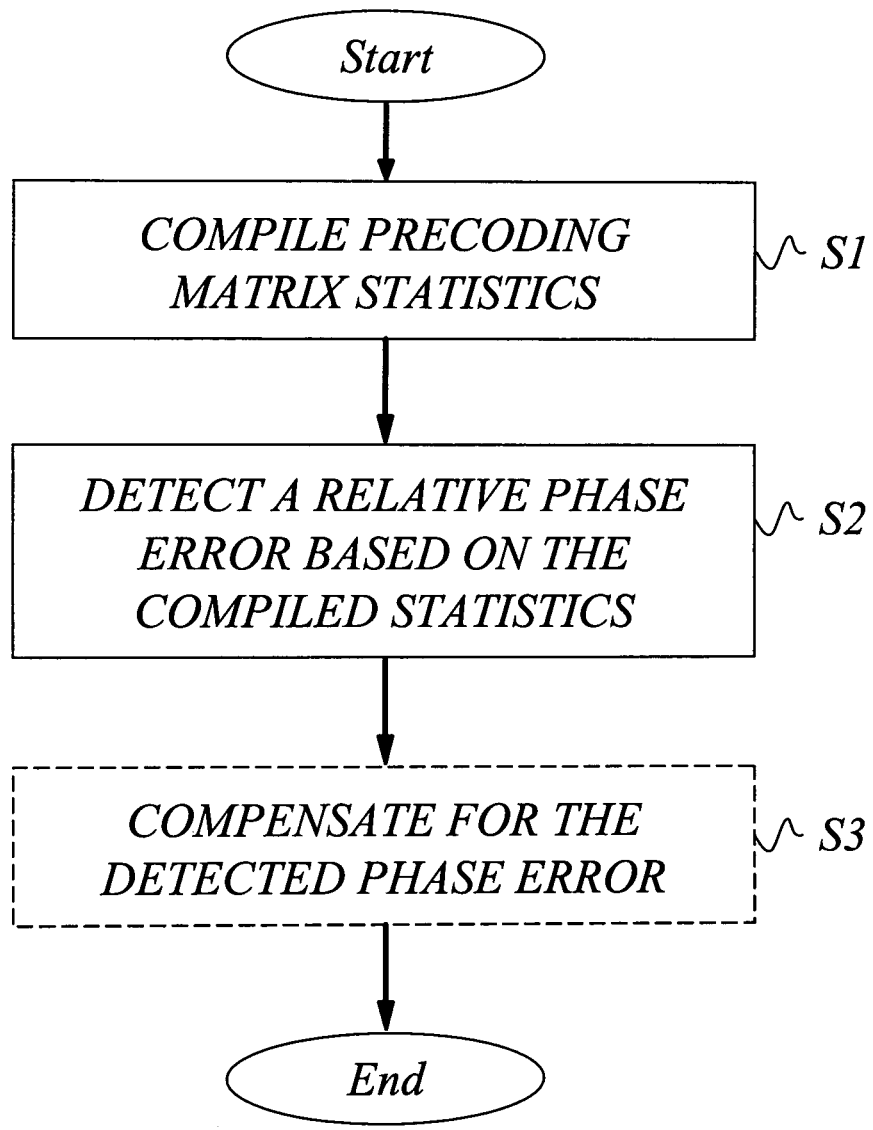
FIG. 3 is a schematic flow diagram illustrating a method for detecting/handling a relative phase error between radio chains in a radio base station according to an exemplary embodiment of the invention.

One embodiment of a method herein is illustrated in the schematic flow diagram of FIG. 3. A first step S1 including compiling precoding matrix statistics representative of phase coherency between at least two radio chains based on feedback information representative of preferred precoding matrix from one or more user equipment terminals. A second step2 includes detecting a relative phase error between radio chains based on the compiled precoding matrix statistics. It is then possible to compensate or otherwise adjust or correct for the detected relative phase error, as indicated in the optional step S3.

Consequently, relevant information on the phase coherency situation can be obtained in an efficient manner by analyzing already existing feedback information from the user equipment terminals to the radio base station. This also enables sufficient phase coherency between radio chains when corresponding compensation is applied.

The precoding matrix statistics may be compiled by collecting feedback information representative of preferred precoding matrix from one or more terminals over time. It may be sufficient with feedback information from a single user equipment terminal, if it can be assumed that the terminal moves over a considerable part of the radio coverage area over time. Preferably however, the precoding matrix statistics is based on feedback information representative of preferred precoding matrix from a plurality of user equipment terminals collected over time (i.e. at several different time instances). The invention may be applied per frequency subband or over the whole relevant frequency band.

It is also possible, and sometimes advantageous to provide more relative importance to feedback information collected at more recent time instances than feedback information collected at less recent time instances. The estimates are continuously updated, and old data are normally regarded as less important. For example, some form of leaky integrator can be used for this purpose.

In a preferred exemplary embodiment of the invention, the relative phase error(s) between radio chains in the radio base station is detected based on the compiled precoding matrix statistics in relation to pre-established precoding matrix reference information. Typically, the pre-established precoding matrix reference information includes precoding matrix reference information corresponding to the antenna configuration assuming coherent radio chains, and the detection of relative phase error(s) is based on detecting a deviation of the compiled precoding matrix statistics from the pre-established precoding matrix reference information, as will be explained in detail later on. The reference information is normally dependent on how the antenna system is configured, and may for example be determined based on simulations or based on real measurements of a coherent reference system. Anyway, it is ensured that the reference information is valid for the current antenna configuration.

The detection of a relative phase error includes at least detection of the presence of a relative phase error, and the compensation part preferably includes estimation of the magnitude and sign of the relative phase error or identification of a specific type of relative phase error, as will be explained with reference to different examples below.

Figure 4:
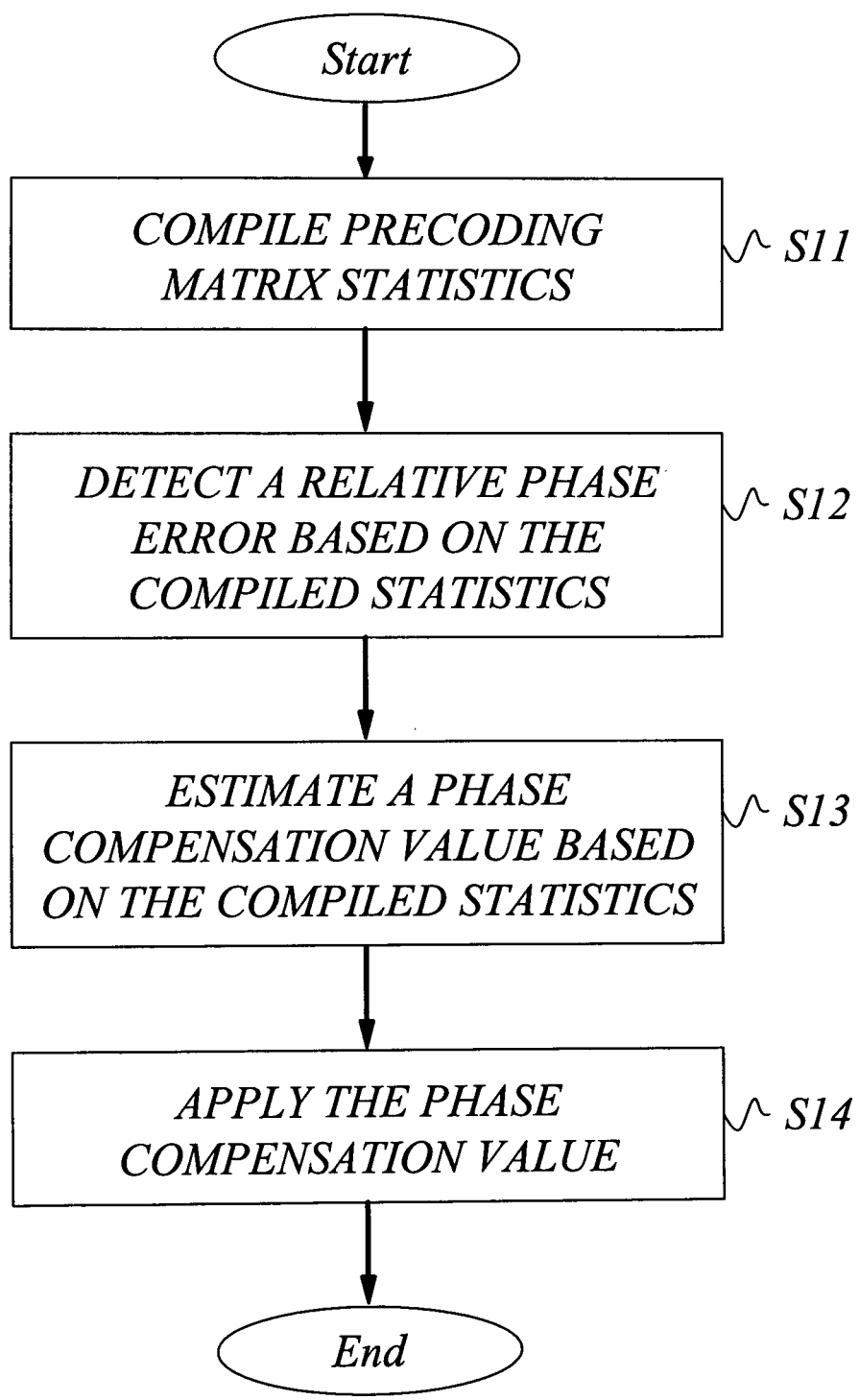
FIG. 4 is a schematic flow diagram illustrating a method for handling a relative phase error between radio chains in a radio base station according to an exemplary embodiment of the invention.

As illustrated in the schematic exemplary flow diagram of FIG. 4, precoding matrix statistics is collected and compiled based on PMI feedback from one or more user equipment terminals in step S11. The presence of a relative phase error between radio chains is detected in step S12 based on the compiled precoding matrix statistics. In step S13, a phase compensation value, also referred to as a phase correction value, is estimated for one or more of the radio chains at least partly based on the compiled precoding matrix statistics and also based on the pre-established reference information. Phase compensation is then effectuated by applying the estimated phase compensation value to the relevant radio chain or chains, as indicated in step S14.

It has been observed that the PMI distribution depends on phase errors. In a particular example, the precoding matrix reference information may thus be established for a set of different relative phase errors. For each of a number of relative phase errors, the reference information may then represent how frequent each of a number of PMI indices is assumed to be used for indicating the preferred precoding matrix, as will be explained in detail later on. For example, a suitable phase compensation value may be estimated by determining a phase correction interval based on a cost function, such as a discriminator function, describing the relative use of different sets of precoding matrix indices, the different sets of precoding matrix indices being defined based on the reference information, and then selecting a phase compensation value within the phase correction interval.

In an exemplary embodiment of the invention, a suitable phase compensation value may be selected by determining a cost function at least partly based on compiled precoding matrix statistics and pre-established reference information, and then selecting a phase compensation value among those phase compensation values that give a relatively low cost in order to maximize system performance.

For example, a phase correction interval for which the cost is below a selected threshold may be determined based on a cost function describing the relative use of two different sets of precoding matrix indices, wherein the two different sets of precoding matrix indices are defined based on the reference information. A suitable phase compensation value may then be selected within the phase correction interval to obtain a relatively low cost of the cost function.

In a related aspect of the invention, the inventors have recognized the possibility of identifying or detecting an incorrect interconnection of radio chains and antennas based on the compiled precoding matrix statistics. The detection of such an incorrect interconnection is preferably also based on some form of PMI reference information representative of correctly connected radio chains and antennas in order to be able to detect a deviation from such reference information. Optionally, the PMI reference information also includes information representative of different types of incorrect interconnections in order to assist in identifying how the cables are wrongly connected. If desired it is possible to correct for the cabling error by switching the interconnection of radio chains and antennas, e.g. manually by a technician at the site installation or by logically re-addressing the radio chains to the antennas (so-called soft switching) by using well-accepted computer-implemented control technology.

For a better understanding, the invention will now be explained in more detail with reference to illustrative and non-limiting examples.

In the following, the exemplary antenna configuration illustrated in FIG. 5 will be assumed. Note though that all aspects of the invention are also applicable to other antenna configurations.

It may be useful to begin by illustrating the impact of improper coherency with reference to a simple simulation covering a single sector. The setup for the simulation is as follows:

Base Station Antenna: The antenna configuration is a four-port dual polarized antenna with separation of 1.0 lambda and slanted polarization +/−45 degrees. Element half power beamwidth of 65 degrees. Elements with identical polarization are connected to antenna ports [1, 2] and [3, 4] respectively.

UE Antenna: The configuration is an ideal dual polarized antenna.

Channel: The channel is assumed to have low angular spread and the vertical and the horizontal components to suffer from independent Rayleigh fading with the same average propagation loss. This leads to the situation where antennas with the same polarization see radio channels with very high correlation while antennas with orthogonal polarizations see radio channels with zero correlation.

Radio: Radio branches 1 and 2 are connected to antenna elements 1 and 2 having identical polarization. Radio branches 3 and 4 are connected to elements 3 and 4 having identical polarization, however orthogonal to elements 1 and 2. The numbering of the radio branches corresponds to element position in precoding vector(s).

Selection of precoding matrix index: Channel capacity is calculated per channel realization and per UE position for all 16 precoding matrices, [1], assuming single layer or dual layers and the transmission scheme giving the highest capacity and hence data rate is selected. The vector elements are applied to the radio chains/branches.

UE location: Uniform distribution over [−60, 60] degrees and for three different SNRs of −5, 0 and 5 dB.

In the following it is assumed, by way of example only, that there is a phase error in one branch only and that this branch is number four according to FIG. 5. It should be understood that this is just an example of a phase error vector, and that the invention is generally applicable for any phase error vector.

Figure 6:
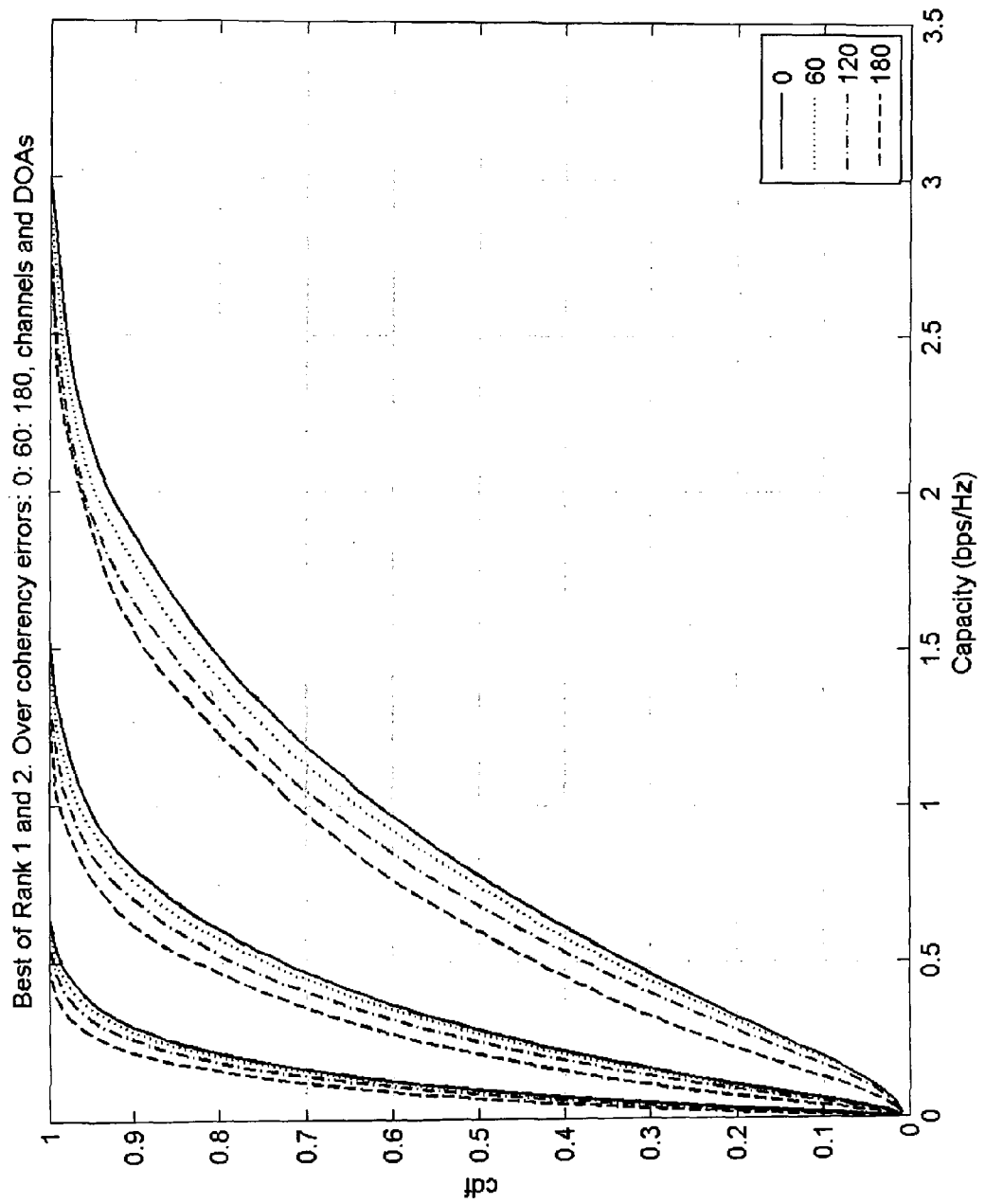
FIG. 6 shows an example of the CDF (Cumulative Distribution Function) of the capacity for different SNR values as a function of the phase error in a given branch.
Figure 7:
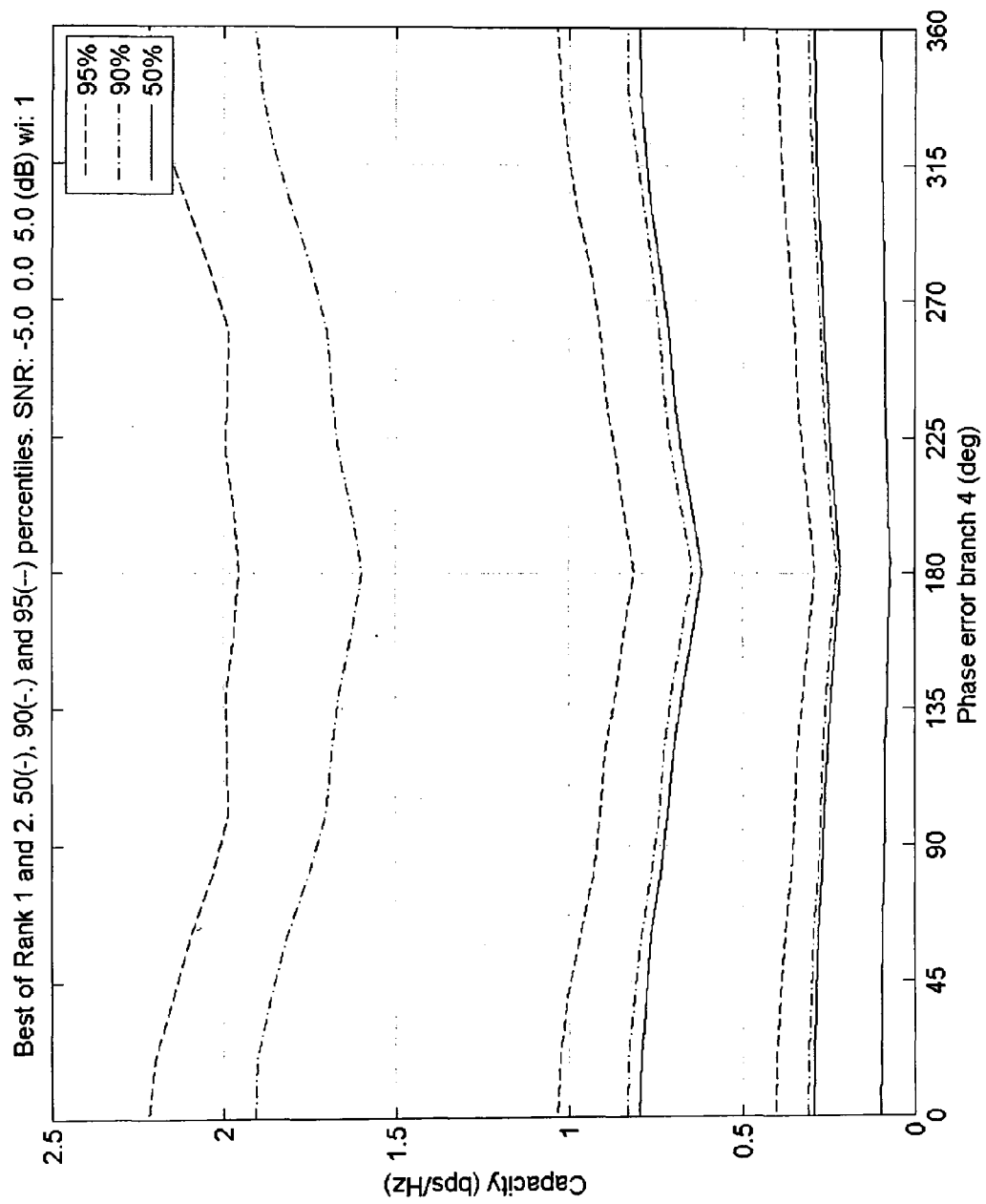
FIG. 7 illustrates capacity percentiles for 50%, 90% and 95% for different SNR over phase errors in a given antenna branch.

FIG. 6 shows an example of the CDF (Cumulative Distribution Function) of the capacity for different SNR values (−5, 0, 5) dB as a function of the phase error (0:60:180 degrees) in branch four. The 50, 90 and 95 percentiles of the capacity are shown in FIG. 7. One can clearly see that performance depends on the phase error with best performance for no phase errors.

From FIG. 6 it is noted that a considerable capacity drop can be expected if a phase error is present. For example, at 5 dB SNR the median (50 percentile) capacity drops from 0.8 to 0.6 bps/Hz corresponding to 25% reduction. Similar (relative) drops in capacity are seen for other SNR levels as well.

Similarly from FIG. 7, which illustrates capacity percentiles for 50%, 90% and 95% for SNR −5, 0 and 5 dB over phase errors 0:20:360 degrees in branch four, it is noted that the largest capacity drop is expected for a phase error of 180 degrees.

Figure 8:
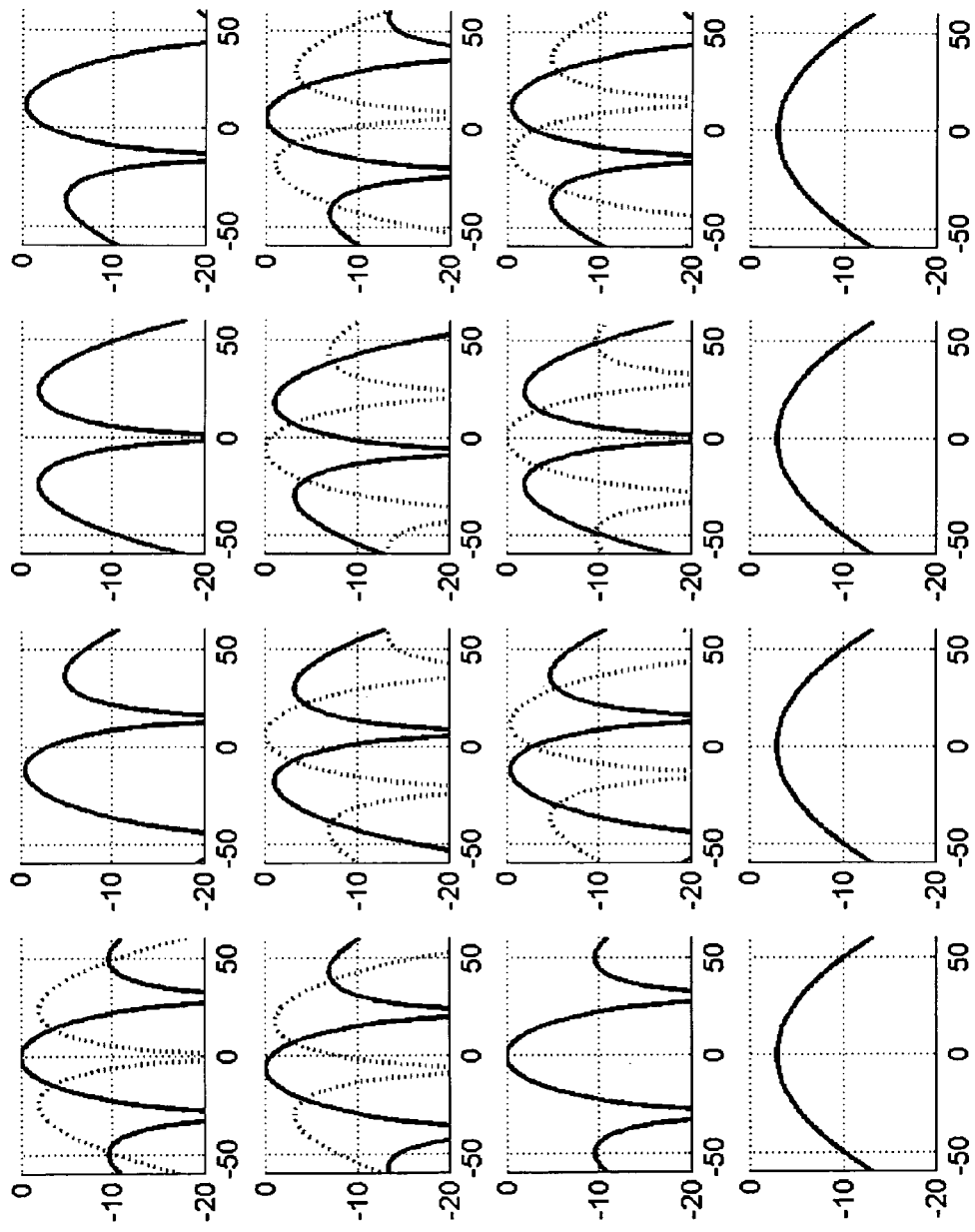
FIG. 8 illustrates an example of beam patterns for 16 precoding matrixes for the case of a coherent system (no phase errors) and transmission of two data streams.
Figure 9:
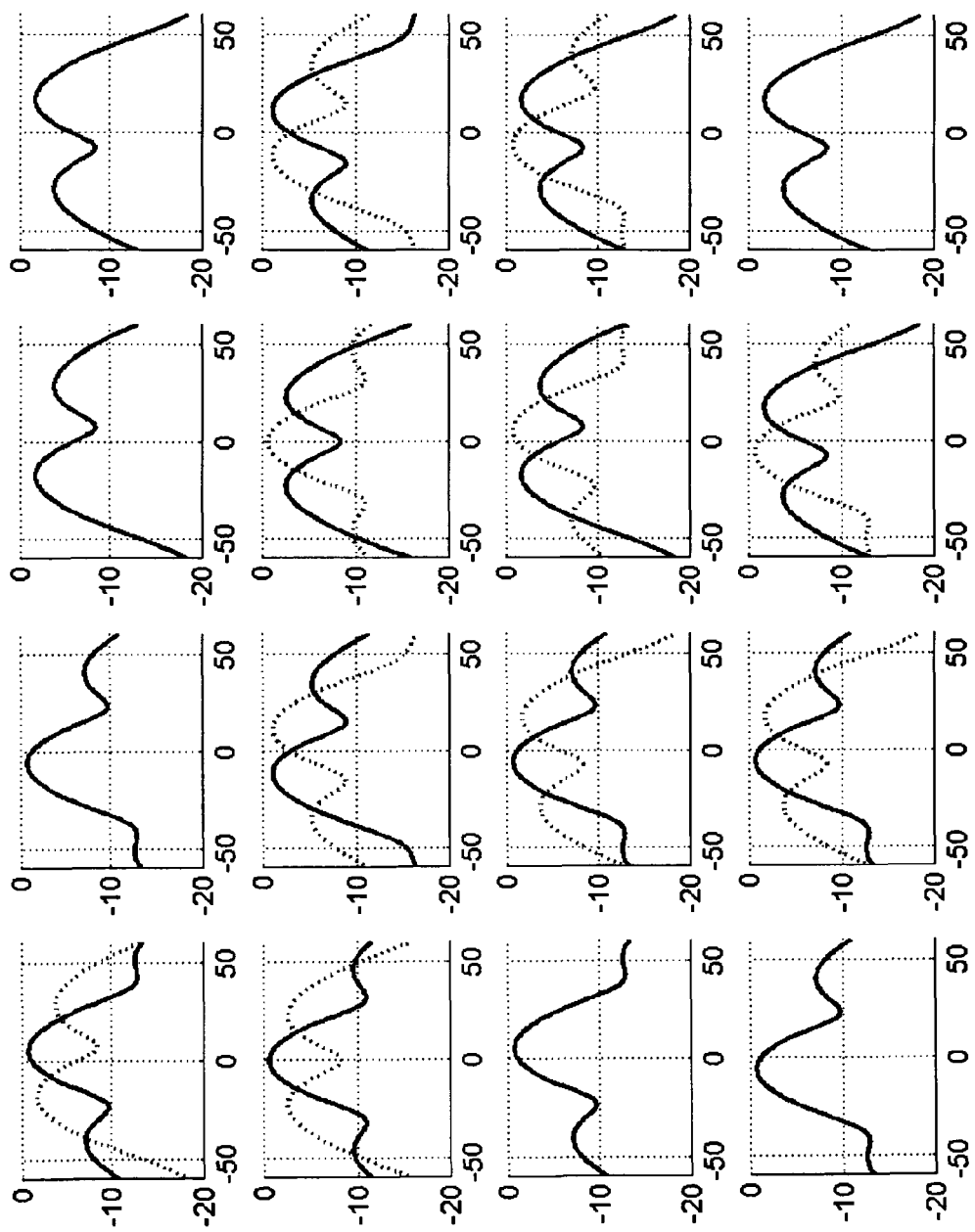
FIG. 9 illustrates an example of beam patterns for 16 precoding matrixes for the case when there is a phase error on one antenna branch.

For the purpose of understanding the results, beam patterns for all 16 available precoding matrixes are shown in FIG. 8 for the case of a coherent system (no phase errors) and two layer transmission, where the beams for layer one are shown in solid lines and for layer two in dotted lines. FIG. 9 shows the case when there is a phase error in branch 4 of 90 degrees. It can be seen that a significant impairment of the beam patterns occurs when there is a relative phase error between radio branches.

Figure 10B:
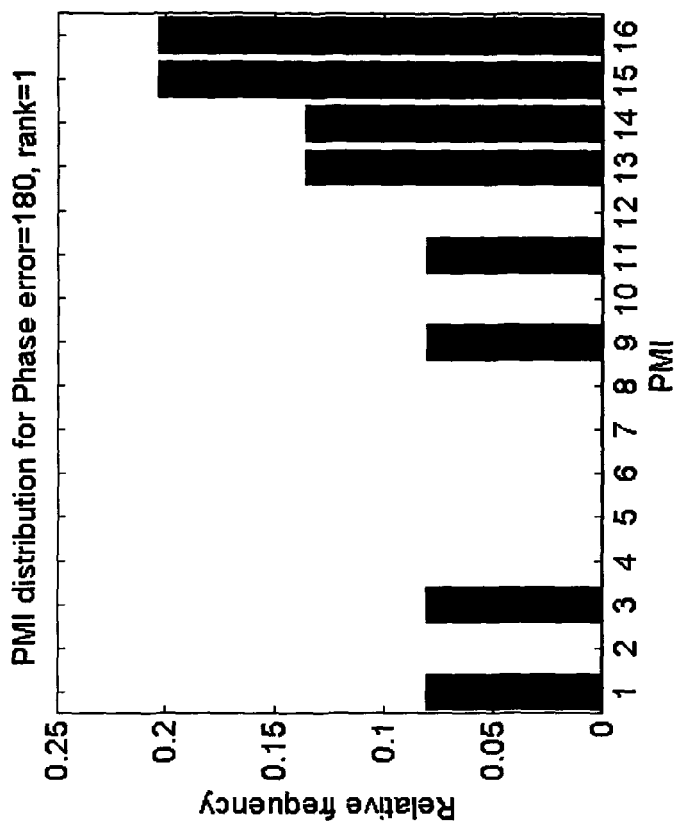
FIGS. 10A-B illustrate examples of PMI (Precoding Matrix Index) statistics for a calibrated antenna system as well as a corresponding antenna system where a phase error of 180° is applied to an antenna branch.
Figure 10A:
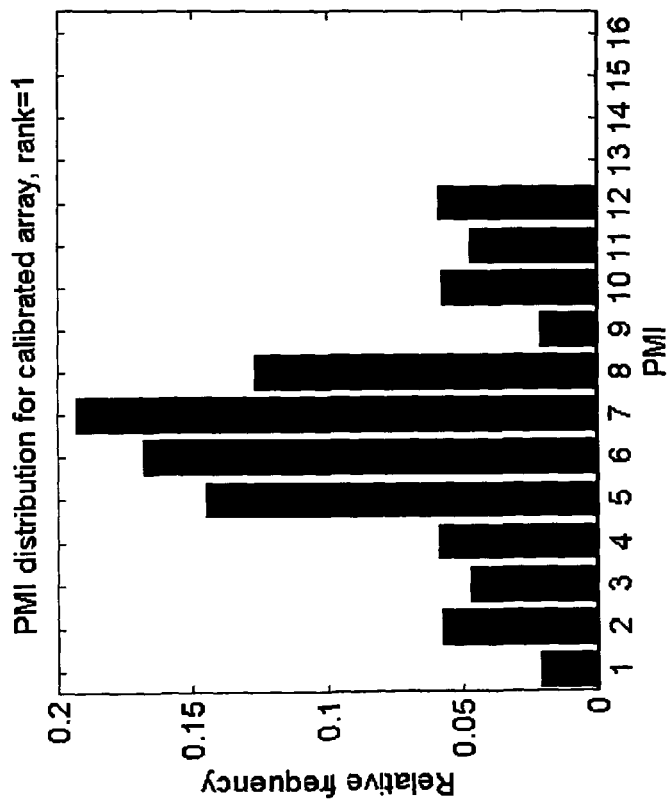

As previously mentioned, one or more embodiments herein recognise that the distribution of the precoding matrix indices (PMI) reported by the UE(s) will be different for an antenna system (including cabling, filters and such) with a relative phase error between radio branches compared to a corresponding antenna system with phase coherent radio branches. FIGS. 10A-B illustrate examples of PMI statistics for a calibrated (coherent) antenna system as well as a corresponding antenna system where a phase error of 1800 is applied to antenna branch number four.

It can be seen from FIGS. 10A-B that the statistics, which is preferably averaged over all users, will be very different in case a phase error is present.

Figure 11:
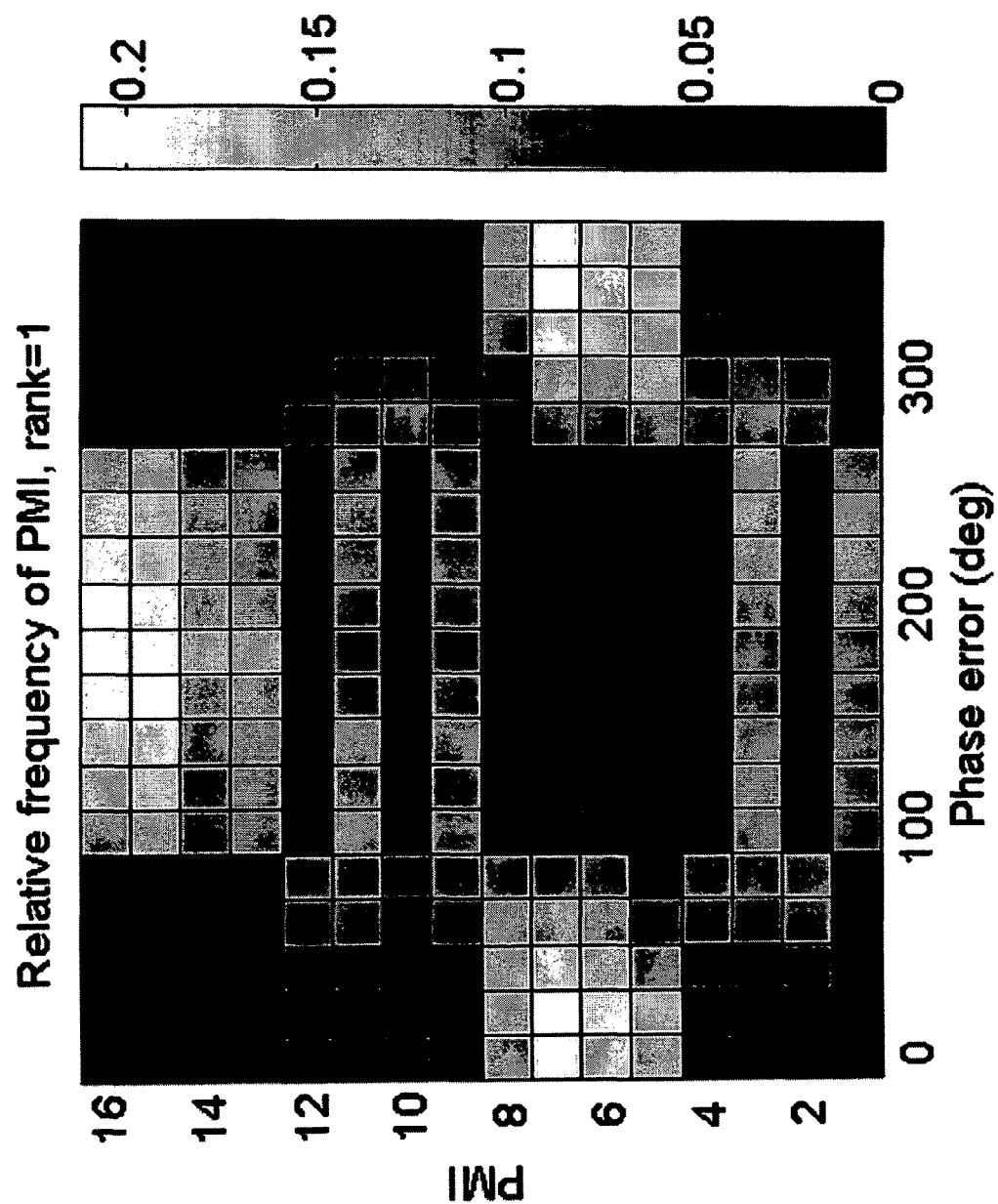
FIG. 11 illustrates an example of a PMI reference distribution plotted for a number of different phase errors.

In FIG. 11, an example of a PMI reference distribution is plotted for a number of different phase errors. Such a PMI distribution is also referred to as a distribution matrix, whereas the distribution for a given phase error is referred to as a distribution vector.

By collecting PMI statistics in the base station such as the eNodeB, collected PMI distribution can then be compared to a stored reference distribution, which have been obtained either by measurements in a calibrated network or obtained by simulations or by any other means. The measured statistics is preferably "matched" to the stored reference information either by a cost function (such as a discriminator) as will be exemplified later on, or by pattern recognition. In this way, an estimate of the phase error can be obtained. If desired this estimate can be further refined, e.g. by searching for an improved estimate. For example, the link capacity may be evaluated for different phase corrections, and a suitable phase correction can then be selected based on this evaluation.

Figures 12A, 12B:
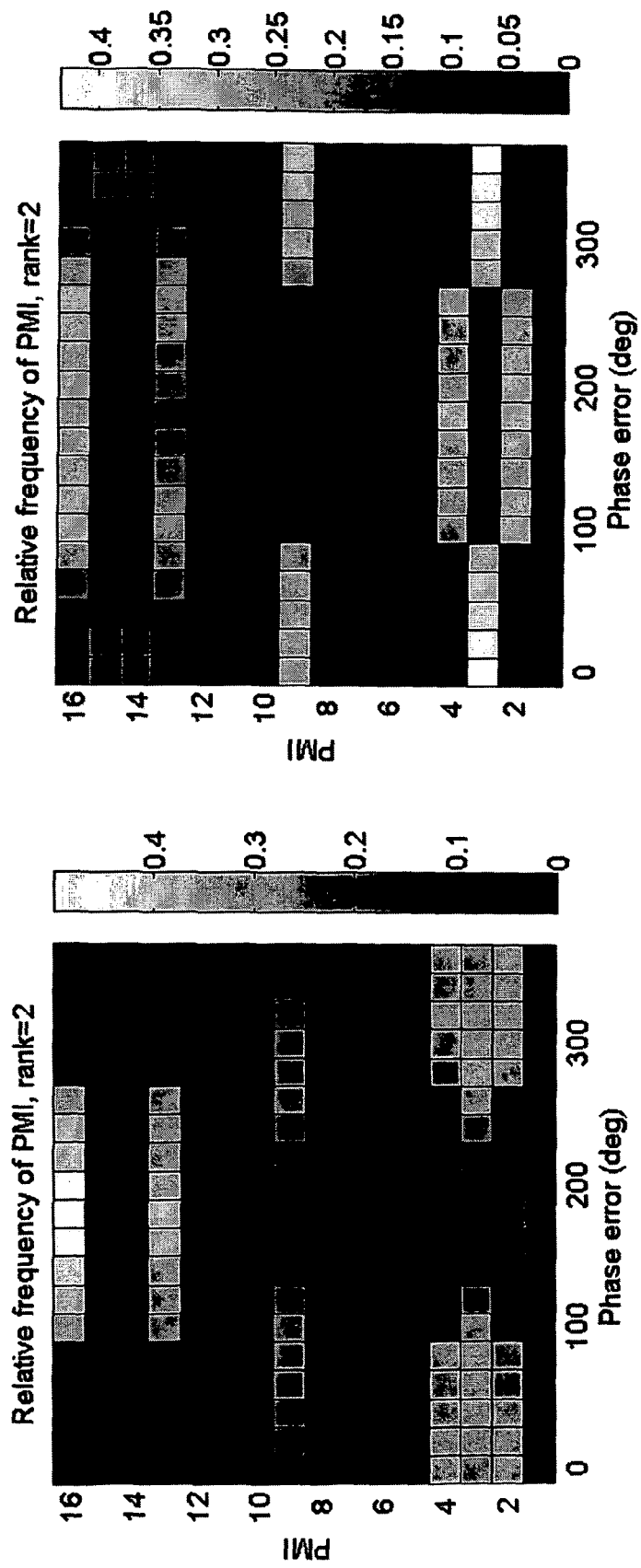
FIG. 12A illustrates an example of a PMI reference distribution (for a number of different phase errors) for the case when the cables are correctly attached.
FIG. 12B illustrates an example of a PMI reference distribution where two cables have been swapped.

A further aspect of the invention is that the PMI statistics makes it possible to detect errors in the cable attachment between radio branches and antenna elements. FIG. 12A illustrates an example of a PMI reference distribution (for a number of different phase errors) for the case when the cables are correctly attached [1 2 3 4], and FIG. 12B illustrates a corresponding example of a PMI reference distribution where two cables have been swapped [1 2 4 3] so that the third and fourth connectors have been interchanged (FIG. 12B).

In order to separate the effect of wrongly connected cables and phase errors originating from other sources it may be advantageous to evaluate the PMI distribution for different known changes of the phase errors, applied by purpose for example at base-band on transmit, and then make a comparison to the total statistics.

Figures 13A, 13B:
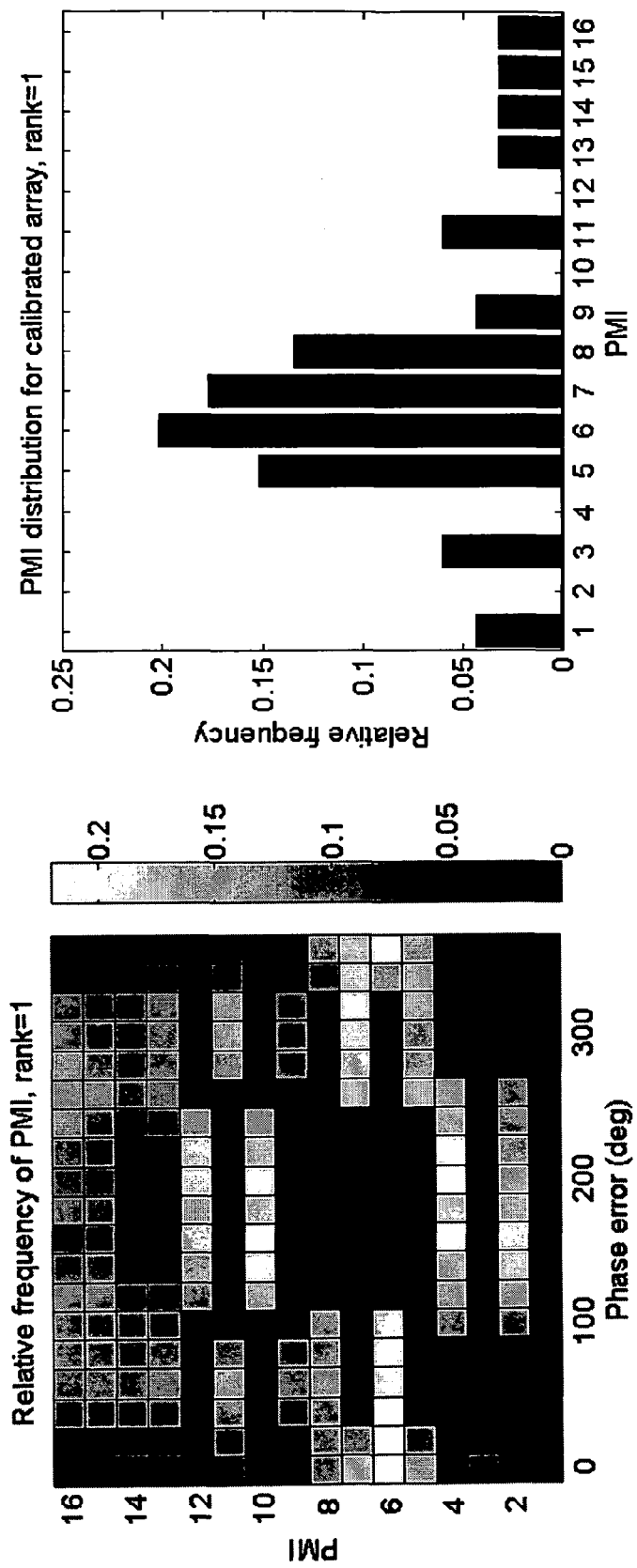
FIG. 13A illustrates an example of a PMI reference distribution matrix for a number of different phase errors for an incorrect cable connection.
FIG. 13B illustrates the corresponding PMI distribution vector for an incorrect cable connection for a phase error of 0 degrees.

FIG. 13A illustrates an example of a PMI reference distribution matrix for a number of different phase errors for a cable connect corresponding to [1 2 4 3]. FIG. 13B illustrates the corresponding PMI distribution vector for a cable connect [1 2 4 3] for a phase error of 0 degrees.

For example, the PMI statistics of rank=1 UE reports may be collected during a period of time, and the collected PMI distribution may then be compared to the PMI reference distribution for a cable connect of [1 2 4 3] in order to be able to detect an incorrect cable attachment.

To ensure that this really is a wrongly connected cable, and not any other phase error, a known phase offset can be applied to the transmitted data. More statistics can be collected, and the process may be repeated a number of times. In this way, the system will have a number of PMI statistic vectors valid for different known phase errors. This enables the system to do a match of several points in the overall PMI distribution "matrix". In other words, we would like to find the matrix M, denoting the reference PMI distribution matrix, which is closest to V, denoting the matrix collection of PMI statistic vectors $v_k$, obtained from reports/measurements when a known phase offset has been applied to the transmitted data. Mathematically, this can for example be describe in terms of a least squares fit between M and V=$[v_1, \ldots, v_k]$. As well known in the literature, any other measure of closeness can be used.

For a more in-depth understanding of the invention, it may be useful to provide an underlying analysis of the different contributions of a phase difference between different branches, followed by a more detailed description of some exemplary embodiments of the invention.

For example, for a scheme with multiple antennas in the base station and a single antenna at the UE, the difference in phase for different paths may be composed by several contributions:

$$\Delta\phi = \phi_{channel} + \phi_{time\_err} + \phi_{phase\_err} + \phi_{antenna} + \phi_{DOA}$$

The character of the different contributions differs. The channel contribution is a result of channels not being perfectly correlated and is thus varying as the channels fade. The time error arises due to different timing errors in the base station, such as different delays in filters and different feeder lengths. Thus timing-difference-induced phase errors are more or less constant over time but frequency-dependent. A phase error may arise, for example from phase-locked loops locking at different phases and may be regarded as constant, both over time and frequency. The antenna contribution models the fact that antenna elements typically are not identical, for example between central and edge elements in an array. Finally, the DOA (direction of arrival) contribution is due to different path lengths between a UE and the individual elements depending on the direction of arrival.

In the LTE standard, for example, there is a requirement that radio chains shall be time aligned such that the time difference between any two radio chains at the antenna port fulfills:

$$\delta_k = |\tau_k - \tau_{ref}| = <65 \text{ ns}$$

As already mentioned the time difference will cause the phase relation between branches to be frequency dependent. Over a bandwidth of 20 MHz the maximal time difference can be transformed to a maximal phase difference of 470 degrees:

$$\Delta\phi_{time\_err} = 2\pi\Delta f \delta_k$$

However, the precoding vectors may be selected for only a portion of the bandwidth, per sub-band (see [2] for detailed information). This means that the phase error due to time errors can be much smaller. For example, if the total bandwidth of 20 MHz is divided into 8 sub-bands the maximal phase difference over frequency, within a sub-band, will be about 59 degrees.

In addition to the frequency-varying phase shift one can expect, for example due to slightly different feeder lengths, the phase to have a random offset (at least in practice not frequency-dependent) of [0, 360] degrees.

The phase in branch k may then be modeled as:

$$\phi(k, f, \delta_k) = \phi_{0,k} + 2\pi f \delta_k,$$

where $\phi_{0,k}$ models the constant phase offset and the second component models the frequency-dependent phase shift (f within the sub-band of interest).

In one aspect of the invention, the purpose of the invention is to compensate for phase errors between radio chains. Both constant (or at least basically frequency-independent) errors and frequency-dependent errors are normally considered.

Figure 5:
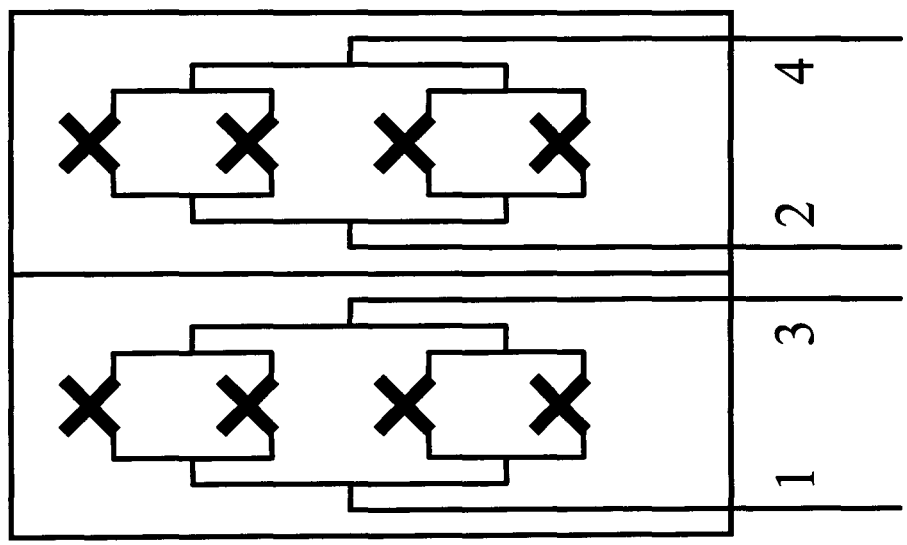
FIG. 5 illustrates an exemplary antenna configuration.

With reference to the example outlined in FIG. 5, this means that there are, for four branches, potentially eight parameters to estimate. Two of these can be regarded as references (only relative phase errors of importance) and set to zero giving a total of six parameters.

Phase errors between branches 1 and 2 will cause the polarization component, corresponding to branches 1 and 2, of the total beam generated by applying the precoding vector(s) elements 1 and 2 to squint in angle. The magnitude of the squint depends on the relative phase shifts, i.e. the phase error, not on the phase shifts themselves. As long as both polarization components squint identically, corresponding to a change in pointing direction (squint) but no change in shape for the power pattern, the performance will in principle be unaffected. This is because there are multiple PMIs to select from corresponding to different inherent beam squints.

So instead of having to estimate three phase shifts it is sufficient to estimate one phase parameter, the difference in phase error between radio chains 1 and 2 and radio chains 3 and 4, respectively. If this difference is kept small the components of the beam, generated per polarization, is pointing in the same general direction.

Assuming that the timing error causes only minor phase errors within each sub-band (or over the entire frequency band), or that the weight vector is selected based on some average over the sub-band, it may be sufficient to estimate only the relative phase offset, i.e. only one parameter.

Once relative phase errors are estimated for multiple sub-bands it is possible to estimate timing errors based on the known fact that a time error gives rise to a linear phase error over frequency.

With reference once again to the PMI reference distribution of FIG. 11, it is shown how frequent each precoding matrix index (PMI) is selected assuming that the channel rank is 1 for phase errors 0:20:360 degrees (between 0 and 360 degrees with 20 degrees separation in-between phase errors), DOA −60:2:60 degrees and Rayleigh fading radio channels. The distribution is normalized so that the sum over PMI for a given phase error equals 1.

In a particular example, the actual PMI statistics based on UE reports is preferably used to generate a "cost" which is minimized by means of a procedure where phase corrections are introduced to the system such that the cost is minimized.

Figure 14:
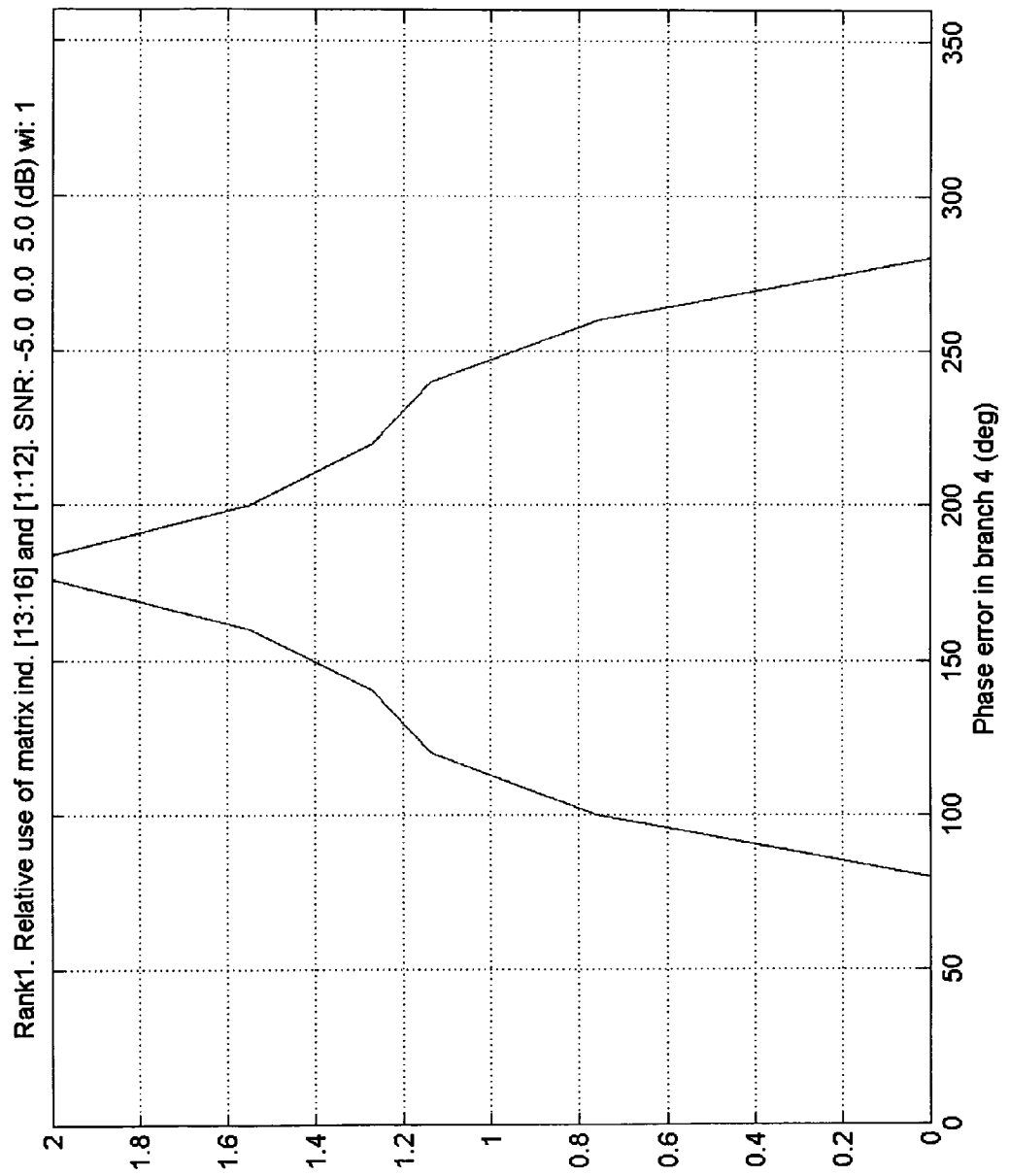
FIG. 14 shows an example of a possible discriminator curve for identifying phase errors based on transmission of one data stream (rank 1 conditions).

FIG. 14 shows an example of a possible discriminator curve, i.e., the cost for different values of a phase error, generated from the reference distribution matrix given a single layer transmission. In this example, the discriminator is given as:

$$Q_1 = \text{Prob}\{PMI\epsilon[13, \ldots, 16]\}/\text{Prob}\{PMI\epsilon[1, \ldots, 12]\}.$$

From FIG. 14 one can see that the cost is zero, or at least very low, for a significant portion (from −80 to +80 degrees) of the x-axis, i.e., possible phase errors. Thus, in order to optimize performance it may not be sufficient just to find phase corrections such that the cost is "zero" but one might need to apply an procedure/method to find the center of the interval where the cost is zero (very low). By doing so the impact of the phase error is really minimized.

Figure 15:
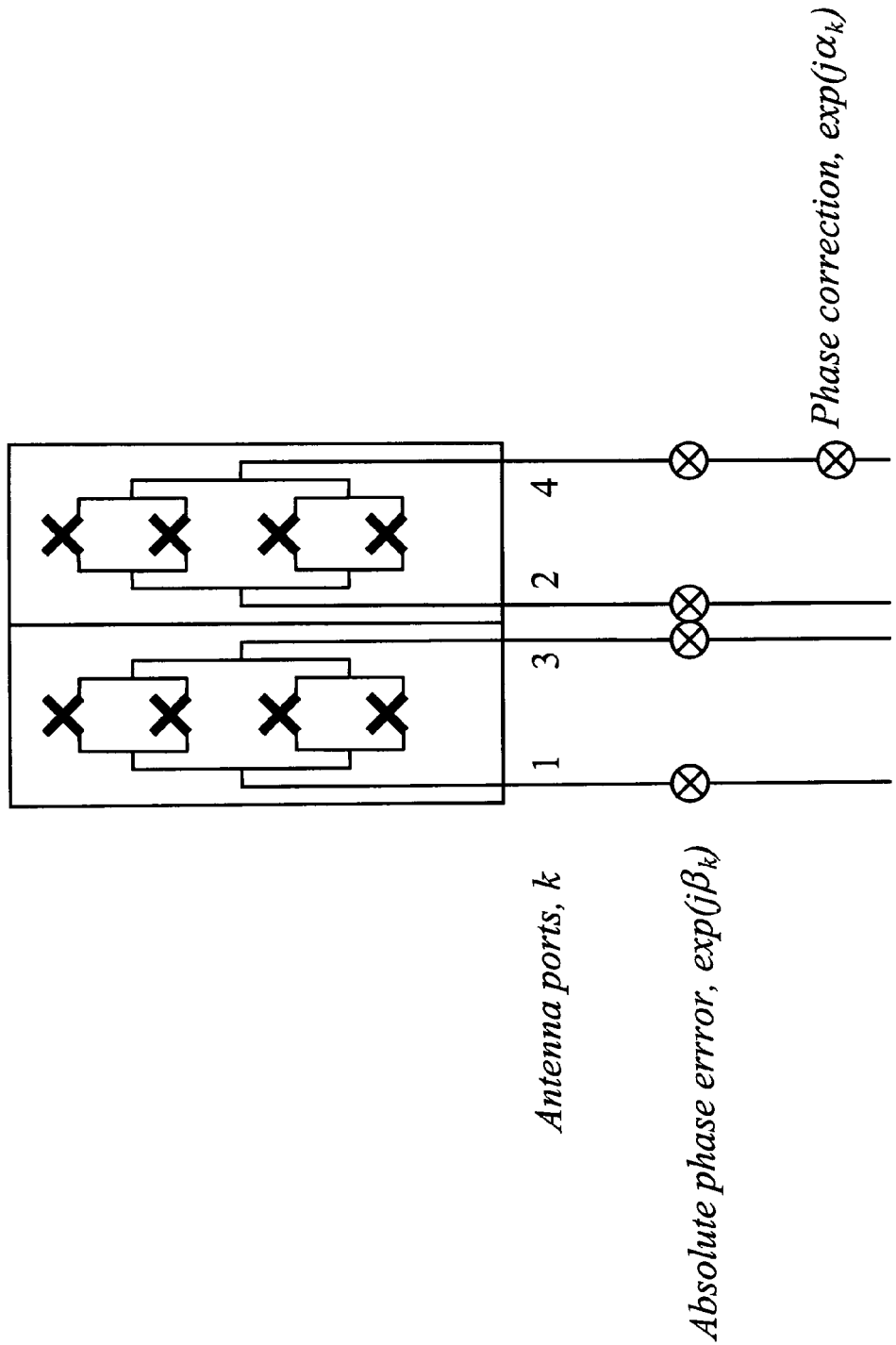
FIG. 15 illustrates an example of a simulation setup, where absolute phase errors are applied to all four branches, and a phase correction value is applied to one of the branches.

A simple example for estimation of a suitable phase correction value is described below. An example of a simulation setup is illustrated in FIG. 15, where absolute phase errors, β, are applied to all four branches. A phase compensation value or phase correction value, α, is applied to branch number four, and the goal is to find a good value for this phase correction value.

Figure 16:
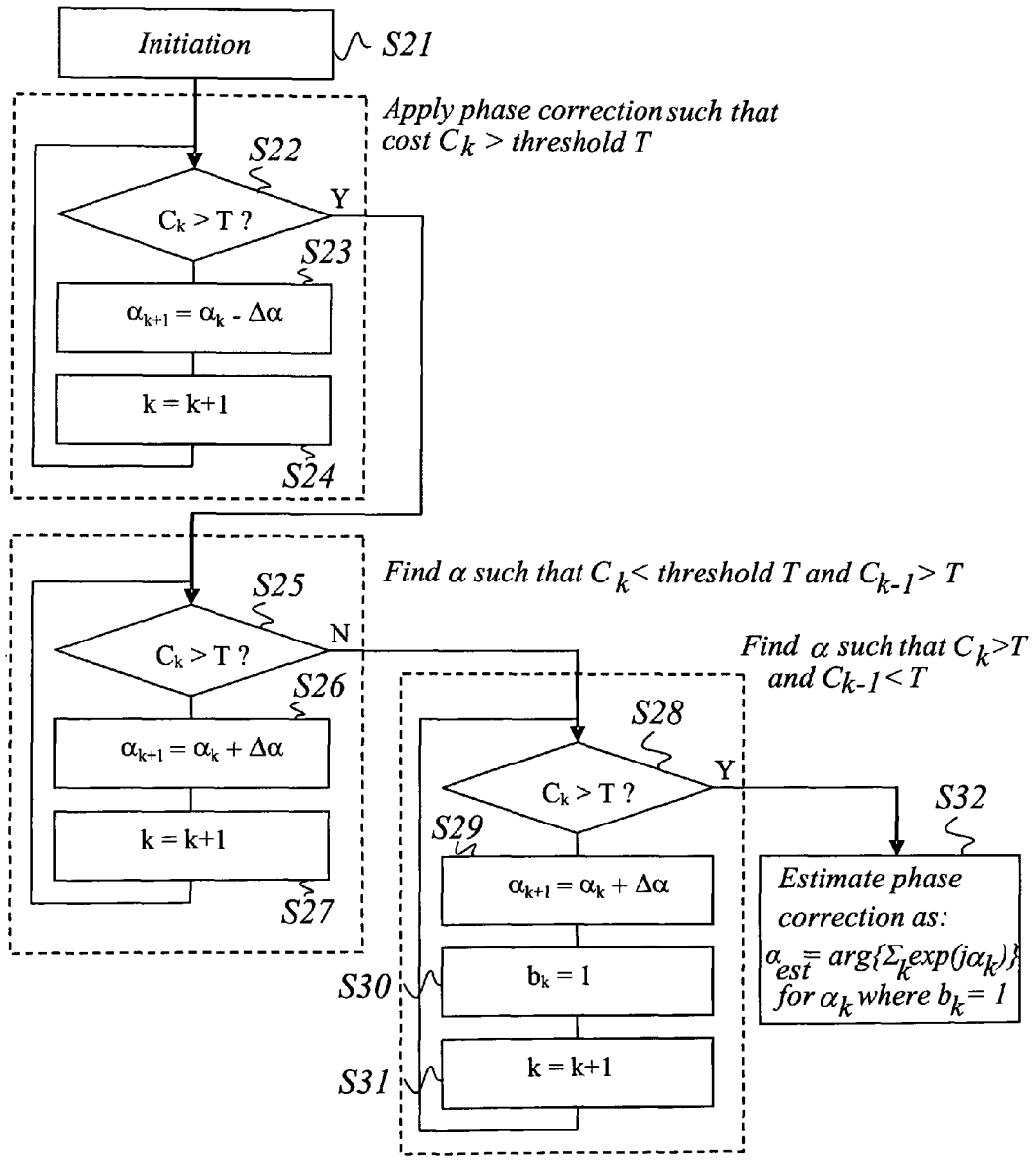
FIG. 16 is a schematic flowchart showing an example of a procedure for estimating a phase compensation value.

FIG. 16 is a schematic flowchart showing an example of a procedure for estimating a phase compensation value. Basically this procedure aims at traversing different phase correction values, finding a vector of those values that correspond to a cost $C_k$ below a given threshold T and finally extracting a suitable phase compensation value. First, some initiation is performed, including resetting values to be used in the procedure, as indicated in step S21. In the next phase (steps S22-S24) it is ensured that a phase correction is applied such that the cost $C_k$ is above (Y) the threshold T in order to obtain a proper starting point for the remaining procedure. The procedure then continues with a stage (steps S25-S27) that aims at finding the position at which the cost $C_k$ is no longer above the threshold (N) but instead falls below the threshold T. The following stage (steps S28-S31) then aims at traversing different phase correction values α until finding a position at which the cost $C_k$ is once again above the threshold (Y). For all phase correction values α (corresponding to a cost below the threshold) traversed during this stage, an associated $b_k$ value is set to 1 indicating that these values may be used for extracting a final phase compensation value $\alpha_{est}$. By way of example, those $\alpha_k$ values that are associated with a $b_k$ value equivalent to 1 are summed up in the complex plane and then the corresponding argument is determined to obtain an estimate of a suitable phase compensation value $\alpha_{est}$.

Of course, other alternative procedures may be employed for determining a phase compensation value, as understood by the skilled person.

In the simulation the following phase errors were applied:

$$\beta=[25\ -45\ 0\ 85](\deg).$$

Figure 17A:
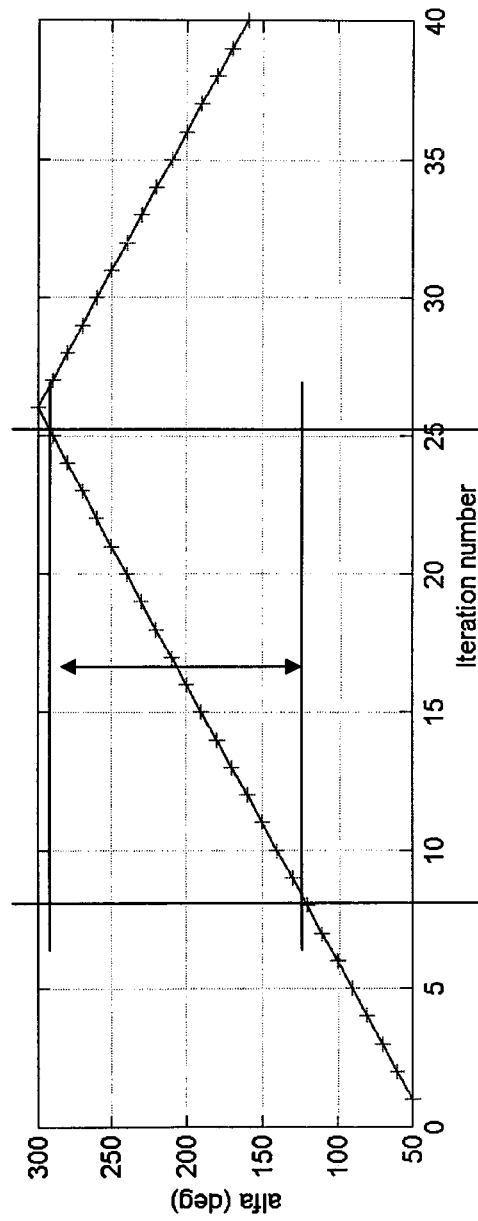
FIG. 17A is a schematic curve diagram illustrating an example of different phase correction values applied in different iterations of the procedure described in connection with FIG. 16.

FIG. 17A is a schematic curve diagram illustrating an example of different phase correction values of α applied in different iterations k of the procedure described in connection with FIG. 16.

Figure 17B:
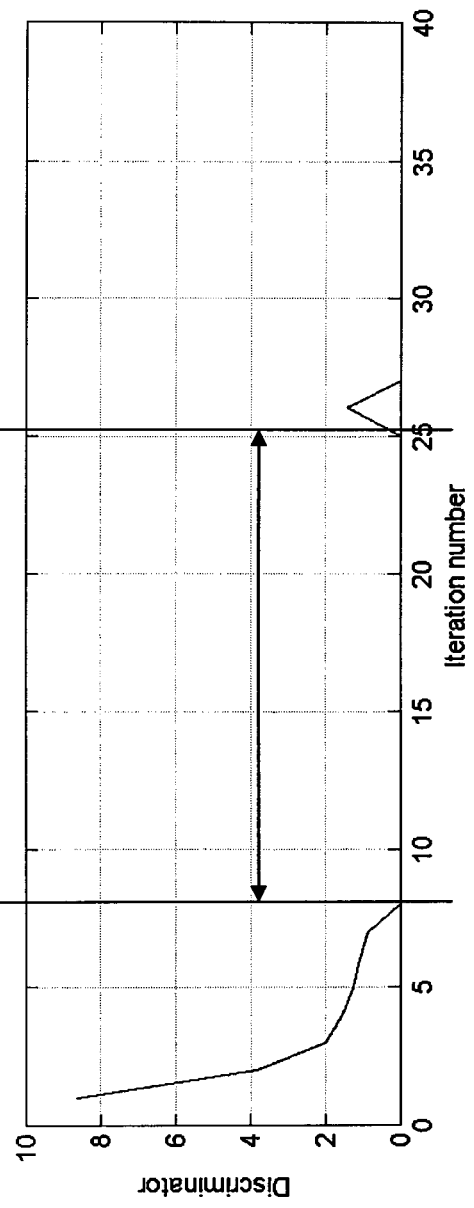
FIG. 17B is a schematic curve diagram illustrating an example of how the discriminator value varies for the different iterations.

FIG. 17B is a schematic curve diagram illustrating an example of how the cost value varies for the different iterations k. It can be seen that the cost value is low for iterations 8 to 25 and from 27 and up.

Figure 18:
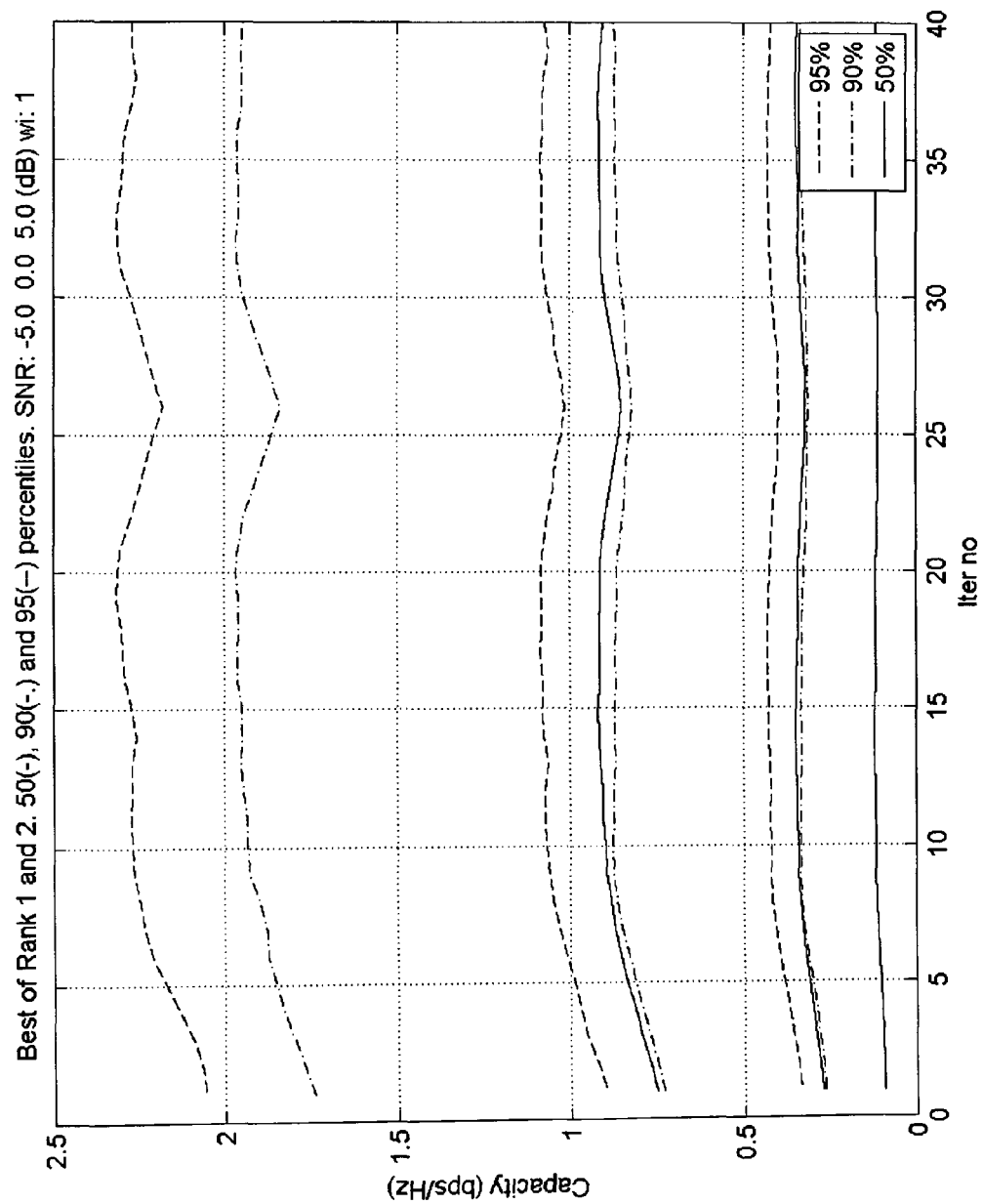
FIG. 18 shows an example of capacity percentiles as a function of iteration number during the search for best correction.

In the example of FIG. 18, capacity percentiles are shown as a function of iteration number during the search for best correction. This figure is shown basically to support understanding of the procedure and also to show that the procedure actually finds a good phase correction value resulting in high capacity.

The cost is below the applied threshold for corrections of [120:10:290] degrees. Thus in this example, the estimated phase correction value becomes 205 degrees or equivalently −155 degrees.

The phase difference between branches one and two, with branch two used as reference, is 25−(−45)=70 degrees.

The phase difference between branches three and four, with four used as reference, is 0−(85)=−85 degrees before correction and 0−(85-155)=70 degrees after correction. The relation is thus the same as for branches one and two which makes all four beams phase coherent and as a consequence pointing in the same direction.

Basically, the above described steps and actions may be implemented in hardware, or any combination of software and hardware, including suitably programmed processors or equivalent computer-implementations. Existing processing capabilities in the base station may for example be re-used if desired. A few examples of possible, non-limiting implementations will now be generally described below.

Implementation Aspects

Figure 19:
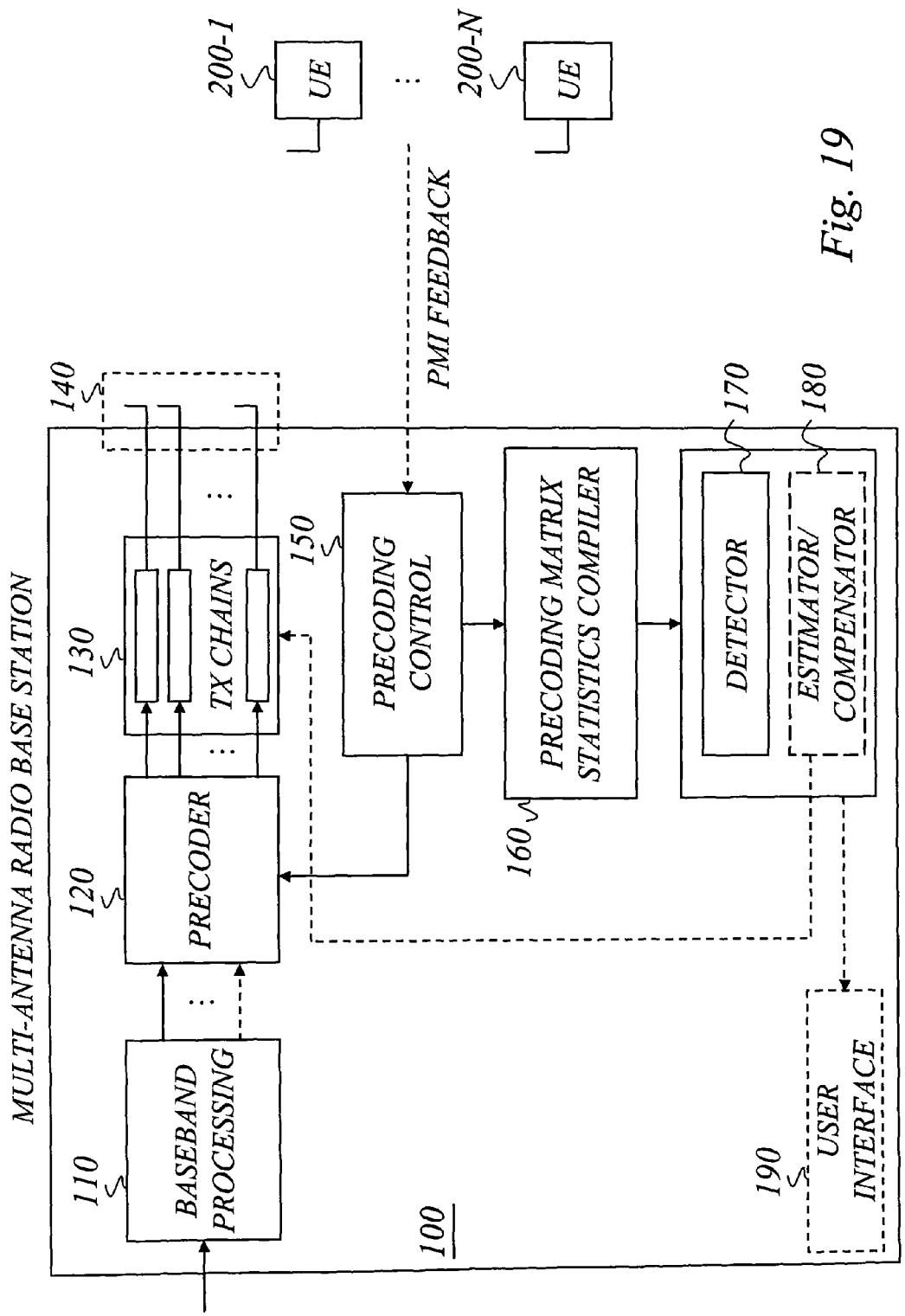
FIG. 19 is a schematic block diagram illustrating a radio base station according to an exemplary embodiment of the invention.

FIG. 19 is a schematic block diagram illustrating a radio base station according to an exemplary embodiment of the invention. The radio base station 100 preferably includes a baseband processing unit 110, a precoder 120, a number of radio chains 130 and a number of antennas 140 to provide for multi-antenna transmission, a precoding control unit 150, a precoding matrix statistics compiler 160, a detector 170, an optional estimator/compensator 180 and optional user interface 190.

The baseband processing unit 110 and the precoder 120 may be conventional units that normally both form part of the overall baseband processing of the radio base station 100.

The precoder 120 normally receives one or more modulated/coded streams of information symbols from the baseband processing unit 110 and transforms the stream or streams by means of a precoding matrix so that they better fit the channel conditions between the radio base station side 100 and the user equipment (UE) side 200.

Precoding is a popular multi-antenna technique for improving the performance of multi-antenna systems. As previously mentioned, precoding is for example an integral part of LTE as well of WCDMA systems.

The radio (transmitter) chains 130 are normally also based on conventional technology, e.g. including digital-to-analog conversion, filtering and frequency up-conversion to radio frequency.

The channel characteristics between radio base station side and the UE side is typically measured at the receiver UE terminals 200-1, . . . , 200-N, and appropriate feedback information is provided to the radio base station 100 through finite-rate feedback channel(s). The feedback information could be in the form of explicit channel state information (CSI) or a quantized representation of the desired precoding matrix. The feedback information is received by the radio base station, for example by the precoding control unit 150, which may then select a suitable precoding matrix using the received channel state information and/or the quantized precoding matrix representation.

In accordance with the present invention, the feedback information may also be used for compiling so-called precoding matrix statistics by the statistics compiler 160. The precoding matrix statistics of the present invention can be used to identify phase coherency status between radio chains 130 in the radio base station 100, and the detector 170 is preferably configured for detecting a relative phase error between at least two of the radio chains 130 based on the compiled precoding matrix statistics.

The detector 170 may alternatively, or as a complement, be configured for detecting a cabling error, i.e. an incorrect connection of radio chains and antennas.

The detector output may simply be an indication of the existence of a relative phase error or a cabling error. In the former case, the estimator/compensator 180, which may be integrated with detector 170, preferably determines an estimate of the magnitude and sign of the relative phase error and then performs appropriate compensation for one or more of the radio chains 130. As an alternative the output of the detector 170, or the integrated unit comprising the detector and estimator/compensator, may be forwarded to the user interface 190, e.g. for alerting an operator of the radio base station. The user interface 190 may even be remotely located.

Figure 20:
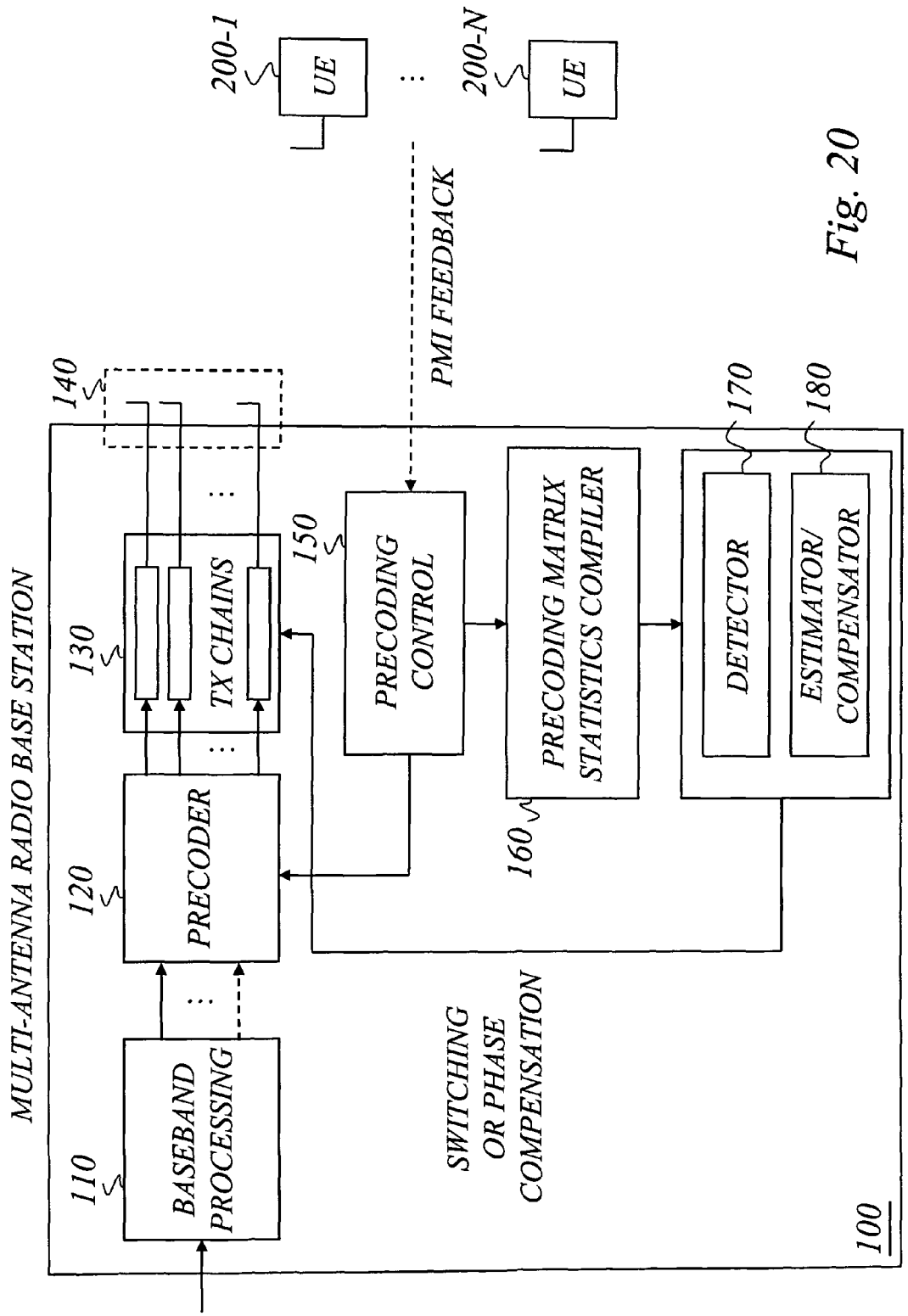
FIG. 20 is a schematic block diagram illustrating a radio base station according to another exemplary embodiment of the invention.

FIG. 20 is a schematic block diagram illustrating a radio base station according to another exemplary embodiment of the invention. In this particular example, the compensator 180 compensates for a relative phase error by applying phase compensation to one or more of the radio chains 130 or corrects for an incorrect interconnection of radio chains and antennas by (soft) switching. If desired, the detector 170 and the estimator/compensator 180 may be integrated within the same unit, as schematically indicated in FIG. 20.

Figure 21:
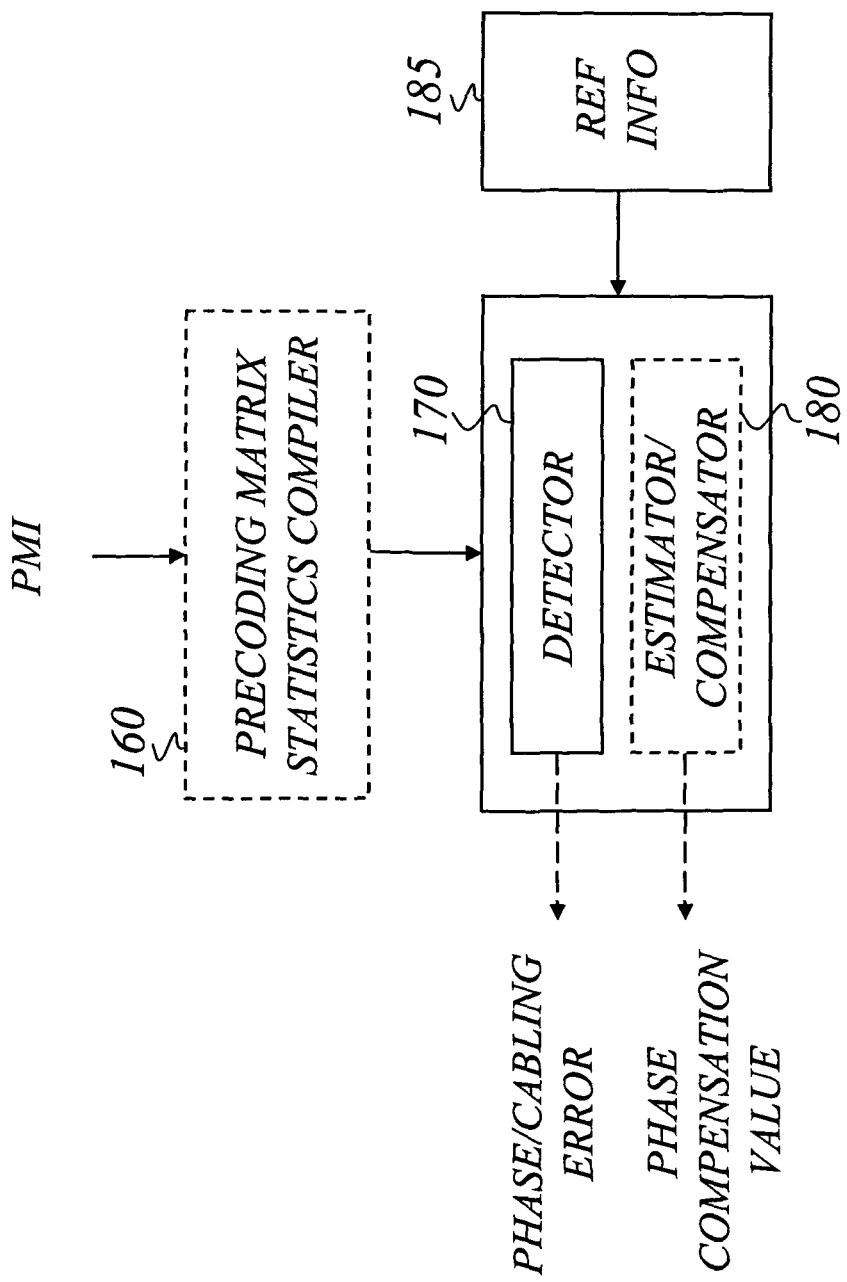
FIG. 21 illustrates a detector module in the context of other relevant parts according to a preferred exemplary embodiment of the invention.

FIG. 21 illustrates a detector for a radio base station in the context of other relevant parts according to a preferred exemplary embodiment of the invention. The precoding matrix statistics compiler 160 preferably collects and compiles PMI information originating from the feedback of one or more UE terminals. The detector 170 is configured for receiving appropriate PMI statistics from the statistics compiler 160 as well as relevant reference information from a reference information unit 185, which maintains pre-established precoding matrix reference information. The detector 170 may be configured for detecting a relative phase error between radio chains and/or for identifying a cabling error, i.e. an incorrect interconnection of radio chains and antennas. In the former case, an associated estimator/compensator 180 may be triggered to estimate the magnitude and sign of a phase compensation value for at least one of the radio chains at least partly based on the precoding matrix statistics and the reference information, as previously described. The estimator/compensator unit 180 may then apply a corresponding phase calibration signal to one or more of the radio chains. Preferably, the detector 170 is implemented together with the estimator/compensator 180 and also the statistics compiler 160 in a radio base station.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] 3GPP TS 36.211 V8.4.0, 2008-09.
[2] 3GPP TS 36.213 V8.4.0, 2008-09.
[3] WO 99/07034.
[4] WO 2008/082345.

The invention claimed is:

1. A method for handling a relative phase error between radio chains in a radio base station having at least two radio chains, said radio base station being configured to precode information symbols using a precoding matrix for multi-antenna transmission to a number of user equipment terminals, said method comprising:
compiling precoding matrix statistics based on feedback information that is received from at least one of said user equipment terminals, that is representative of one or more precoding matrix indices (PMI), and that is collected over time to represent phase coherency between at least two of said radio chains;
detecting a relative phase error between at least two of said radio chains, and estimating a phase compensation value for at least one of said radio chains, based on said precoding matrix statistics and pre-established precoding matrix reference information, wherein the pre-established precoding matrix reference information represents, for each of a number of relative phase errors, how frequent each of a number of precoding matrix indices is assumed to be used for indicating preferred precoding matrix; and
compensating for said detected relative phase error by applying a phase compensation for at least one of said radio chains based on said estimated phase compensation value.

2. The method of claim 1, wherein said pre-established precoding matrix reference information includes at least precoding matrix reference information corresponding to radio chains with no phase errors, and wherein detecting a relative phase error comprises detecting a deviation of said compiled precoding matrix statistics from said pre-established precoding matrix reference information.

3. The method of claim 2, wherein estimating a phase compensation value comprises estimating the magnitude and sign of said phase compensation value for at least one of said radio chains at least partly based on said compiled precoding matrix statistics and said pre-established reference information.

4. The method of claim 3, wherein estimating the magnitude and sign of the phase compensation value comprises:
determining a cost function at least partly based on said compiled precoding matrix statistics and said pre-established reference information; and
selecting the phase compensation value from among one or more possible phase compensation values that, according to said cost function, gives a minimized cost, in order to maximize system performance.

5. The method of claim 4, wherein estimating the magnitude and sign of the phase compensation value comprises:
determining a phase correction interval for which the cost of one or more possible phase compensation values in that interval is below a selected threshold, wherein the cost function describes the relative use of two different sets of precoding matrix indices, wherein said two different sets of precoding matrix indices are defined based on said pre-established reference information; and
determining the phase compensation value as a phase compensation value within said phase correction interval.

6. A radio base station having multiple radio chains and a precoder configured to precode information symbols using a precoding matrix for multi-antenna transmission to a number of user equipment terminals, said radio base station comprising:
a compiler circuit configured to compile precoding matrix statistics based on feedback information that is received from at least one of said user equipment terminals, that is representative of one or more precoding matrix indices (PMI), and that is collected over time to represent phase coherency between at least two of said radio chains;
a detector circuit configured to detect a relative phase error between at least two of said radio chains, and an estimator circuit configured to estimate a phase compensation value for at least one of said radio chains, based on said precoding matrix statistics and pre-established precoding matrix reference information, wherein the pre-established precoding matrix reference information represents, for each of a number of relative phase errors, how frequent each of a number of precoding matrix indices is assumed to be used for indicating preferred precoding matrix; and
a compensator circuit configured to compensate for said detected relative phase error by applying a phase compensation for at least one of said radio chains based on said estimated phase compensation value.

7. The radio base station of claim 6, wherein said pre-established precoding matrix reference information includes at least precoding matrix reference information corresponding to radio chains with no phase errors, and wherein said detector circuit is configured to detect a deviation of said compiled precoding matrix statistics from said pre-established precoding matrix reference information.

8. The radio base station of claim 7, wherein said estimator circuit is configured to estimate the magnitude and sign of the phase compensation value for at least one of said radio chains at least partly based on said compiled precoding matrix statistics and said pre-established reference information.

9. The radio base station of claim 8, wherein said estimator circuit is configured to estimate the magnitude and sign of the phase compensation value by:
   determining a cost function at least partly based on said compiled precoding matrix statistics and said pre-established reference information; and
   selecting the phase compensation value from among one or more possible phase compensation values that, according to said cost function, gives a minimized cost, in order to maximize system performance.

10. The radio base station of claim 9, wherein said estimator circuit is configured to estimate the magnitude and sign of the phase compensation value by:
   determining a phase correction interval for which the cost of one or more possible phase compensation values in that interval is below a selected threshold, wherein the cost function describes the relative use of two different sets of precoding matrix indices, wherein said two different sets of precoding matrix indices are defined based on said pre-established reference information; and
   determining the phase compensation value as a phase compensation value within said phase correction interval.

11. The radio base station of claim 6, wherein said radio base station is an eNodeB.

\* \* \* \* \*

UNITED STATES PATENT AND TRADEMARK OFFICE
CERTIFICATE OF CORRECTION

PATENT NO. : 9,054,415 B2
APPLICATION NO. : 13/146421
DATED : June 9, 2015
INVENTOR(S) : Göransson et al.

Page 1 of 1

It is certified that error appears in the above-identified patent and that said Letters Patent is hereby corrected as shown below:

In the specification

In Column 3, Line 7, delete "one" and insert -- One --, therefor.

In Column 5, Line 16, delete "including" and insert -- includes --, therefor.

In Column 5, Line 21, delete "step2" and insert -- step S2 --, therefor.

In Column 9, Line 40, after equation, insert -- . --.

Signed and Sealed this
Fifth Day of April, 2016

Michelle K. Lee
*Director of the United States Patent and Trademark Office*